United States Patent
Escott et al.

(10) Patent No.: US 11,895,723 B2
(45) Date of Patent: Feb. 6, 2024

(54) METHOD, APPARATUS, AND SYSTEM FOR REESTABLISHING RADIO COMMUNICATION LINKS DUE TO RADIO LINK FAILURE

(71) Applicant: QUALCOMM Incorporated, San Diego, CA (US)

(72) Inventors: Adrian Edward Escott, Reading (GB); Mungal Singh Dhanda, Slough (GB); Anand Palanigounder, San Diego, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 17/104,811

(22) Filed: Nov. 25, 2020

(65) Prior Publication Data
US 2021/0084707 A1    Mar. 18, 2021

Related U.S. Application Data

(63) Continuation of application No. 16/575,200, filed on Sep. 18, 2019, now Pat. No. 10,880,946, which is a
(Continued)

(51) Int. Cl.
*H04W 76/19*    (2018.01)
*H04W 36/00*    (2009.01)
(Continued)

(52) U.S. Cl.
CPC ......... *H04W 76/19* (2018.02); *H04W 12/106* (2021.01); *H04W 36/0079* (2018.08); *H04L 63/12* (2013.01); *H04W 36/305* (2018.08)

(58) Field of Classification Search
None
See application file for complete search history.

(56) References Cited

U.S. PATENT DOCUMENTS 9,191,812 B2 * 11/2015 Escott ............... H04W 36/0038
10,462,837 B2    10/2019 Escott et al.
(Continued)

FOREIGN PATENT DOCUMENTS

CN    101779391 A    7/2010
CN    101835156 A    9/2010
(Continued)

OTHER PUBLICATIONS

Intel Corporation: "Connected Mode Mobility for NB-IOT UE using CP CIoT EPS Optimisation", 3GPP Draft; R2-166683, 3rd Generation Partnership Project (3gpp), Mobile Competence Centre, 650, Route Des Lucioles, F-06921 Sophia-Antipolis Cedex, France, vol. RAN WG2, No. Kaohslung; Oct. 9, 2016, XP051151161, Retrieved from the Internet: URL:http://www.3gpp.org/ftp/MeetIngs_3GPP_SYNC/RAN2/Docs/ [retrieved on Oct. 9, 2016], 6 pages.
(Continued)

*Primary Examiner* — Sithu Ko
*Assistant Examiner* — Emmanuel K Maglo
(74) *Attorney, Agent, or Firm* — Loza & Loza, LLP

(57) ABSTRACT

One feature pertains to a method that includes establishing a radio communication connection with a first radio access node (RAN) that uses control plane signaling connections to carry user plane data. The method also includes determining that the wireless communication device is experiencing radio link failure (RLF) with the first RAN and that the radio communication connection should be reestablished with a second RAN. A reestablishment request message is transmitted to the second RAN that includes parameters that enable a core network node communicatively coupled to the
(Continued)

second RAN to authenticate the wireless communication device and allow or reject reestablishment of the radio communication connection. The parameters include at least a message authentication code (MAC) based in part on one or more bits of a non-access stratum (NAS) COUNT value maintained at the wireless communication device.

20 Claims, 19 Drawing Sheets

Related U.S. Application Data continuation of application No. 15/443,981, filed on Feb. 27, 2017, now Pat. No. 10,462,837.

(60) Provisional application No. 62/417,931, filed on Nov. 4, 2016.

(51) Int. Cl.
| | | |
|---|---|---|
| H04W 12/106 | (2021.01) | |
| H04L 9/40 | (2022.01) | |
| H04W 36/30 | (2009.01) | |

(56) References Cited

U.S. PATENT DOCUMENTS

| | | | |
|---|---|---|---|
| 2009/0104890 A1 | 4/2009 | Wang et al. | |
| 2010/0235634 A1 | 9/2010 | Fischer | |
| 2010/0293372 A1 | 11/2010 | Fischer et al. | |
| 2011/0072488 A1 | 3/2011 | Bi et al. | |
| 2011/0225424 A1* | 9/2011 | Zee | H04L 63/061 |
| | | | 713/171 |
| 2012/0077501 A1 | 3/2012 | Zhang et al. | |
| 2012/0129491 A1 | 5/2012 | Prasad et al. | |
| 2012/0140731 A1 | 6/2012 | Drapkin et al. | |
| 2012/0281566 A1* | 11/2012 | Pelletier | H04W 72/1221 |
| | | | 370/252 |
| 2013/0044708 A1 | 2/2013 | Kim et al. | |
| 2013/0044709 A1* | 2/2013 | Adjakple | H04W 76/15 |
| | | | 370/329 |
| 2013/0046821 A1 | 2/2013 | Alanara et al. | |
| 2013/0128866 A1 | 5/2013 | Zhang et al. | |
| 2013/0129491 A1 | 5/2013 | Lei et al. | |
| 2013/0242754 A1 | 9/2013 | Shaikh et al. | |
| 2013/0305386 A1* | 11/2013 | Zhang | H04L 63/205 |
| | | | 726/27 |
| 2013/0310006 A1* | 11/2013 | Chen | H04W 12/04 |
| | | | 455/411 |
| 2013/0315075 A1* | 11/2013 | Tamura | H04W 24/10 |
| | | | 370/242 |
| 2014/0003354 A1 | 1/2014 | Ekici et al. | |
| 2014/0022972 A1* | 1/2014 | Ahn | H04W 36/20 |
| | | | 370/331 |
| 2014/0056243 A1* | 2/2014 | Pelletier | H04W 16/32 |
| | | | 370/329 |
| 2014/0235232 A1* | 8/2014 | Lee | H04W 76/19 |
| | | | 455/423 |
| 2014/0241317 A1* | 8/2014 | Jamadagni | H04W 36/28 |
| | | | 370/329 |
| 2015/0009802 A1 | 1/2015 | Wager et al. | |
| 2015/0010154 A1 | 1/2015 | Chen | |
| 2015/0092686 A1 | 4/2015 | Cui et al. | |
| 2015/0146519 A1* | 5/2015 | Zakrzewski | H04W 8/06 |
| | | | 370/221 |
| 2016/0021697 A1* | 1/2016 | Vargantwar | H04W 76/19 |
| | | | 370/329 |
| 2016/0057802 A1* | 2/2016 | Lee | H04W 76/19 |
| | | | 370/329 |
| 2016/0073301 A1 | 3/2016 | Yanagisako et al. | |
| 2016/0255551 A1* | 9/2016 | Susitaival | H04W 28/0278 |
| | | | 370/334 |
| 2016/0269952 A1* | 9/2016 | Moon | H04W 36/08 |
| 2018/0007552 A1* | 1/2018 | Bae | H04L 63/083 |
| 2018/0132293 A1 | 5/2018 | Escott et al. | |
| 2018/0249479 A1* | 8/2018 | Cho | H04W 12/086 |
| 2020/0015310 A1 | 1/2020 | Escott et al. | |

FOREIGN PATENT DOCUMENTS

| | | |
|---|---|---|
| CN | 102026165 A | 4/2011 |
| CN | 103856979 A | 6/2014 |
| CN | 104936242 A | 9/2015 |
| EP | 2567559 A1 | 3/2013 |
| GB | 2455610 A | 6/2009 |
| WO | 2009075341 A1 | 6/2009 |
| WO | 2016153130 A1 | 9/2016 |

OTHER PUBLICATIONS

Intel Corporation: "Security of RRC Connection Re-establishment of NB-IOT for CP Solution", 3GPP Draft; S3-161717, 3rd Generation Partnership Project (3gpp), Mobile Competence Centre, 650, Route Des Lucioles, F-06921 Sophia-Antipolis Cedex, France, vol. SA WG3, No. Santa Cruz (Spain); Oct. 31, 2016, XP051170580, Retrieved from the Internet: URL:http://www.3gpp.org/ftp/tsg_sa/WG3_Security/TSGS3_85_Santa_Cruz/Docs/ [retrieved on Oct. 31, 2016], 5 pages.
International Preliminary Report on Patentability—PCT/US2017/058947, The International Bureau of WIPO—Geneva, Switzerland, dated May 16, 2019.
International Search Report and Written Opinion—PCT/US2017/058947—ISA/EPO—dated Jan. 29, 2018.

\* cited by examiner

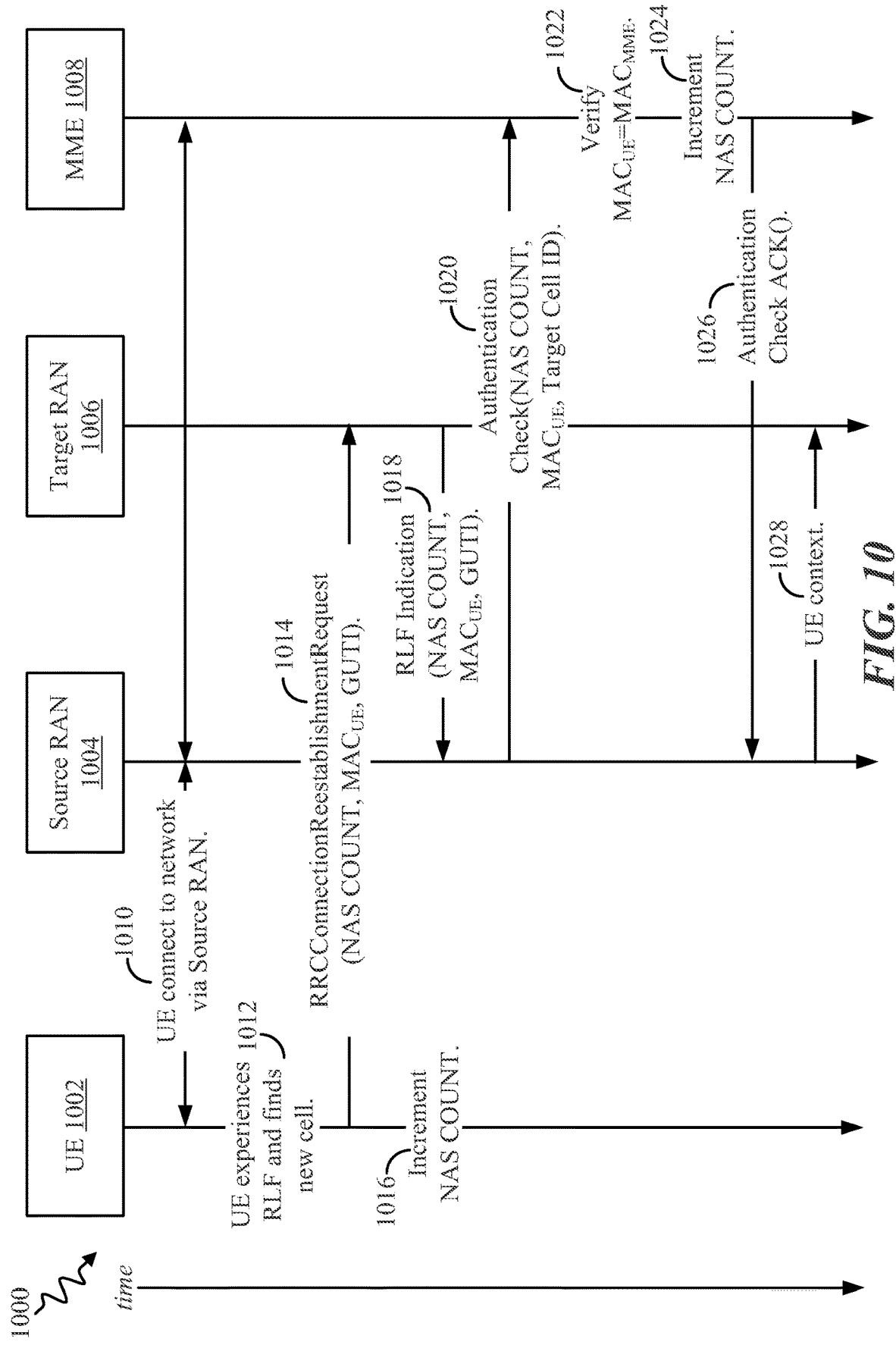

1400

1402 — Receive from a wireless communication device a request to reestablish a radio communication connection that uses control plane signaling connections to carry user plane data with the network device, the wireless communication device experiencing radio link failure (RLF) of a previously established radio communication connection with a radio access node (RAN), the request including parameters that enable a core network node communicatively coupled to the network device to authenticate the wireless communication device and allow or reject reestablishment of the radio communication connection with the network device, wherein the parameters include at least a message authentication code (MAC) based in part on one or more bits of a non-access stratum (NAS) COUNT value maintained at the wireless communication device.

1404 — Send a message to the core network node or the RAN that includes the parameters.

*FIG. 14*

METHOD, APPARATUS, AND SYSTEM FOR REESTABLISHING RADIO COMMUNICATION LINKS DUE TO RADIO LINK FAILURE

CLAIM FOR PRIORITY

This application for patent is a continuation of and claims the benefit of nonprovisional patent application Ser. No. 16/575,200 entitled "Method, Apparatus, and System For Reestablishing Radio Communication Links Due To Radio Link Failure" filed in the United States Patent and Trademark Office on Sep. 18, 2019, which is a continuation of nonprovisional patent application Ser. No. 15/443,981 entitled "Method, Apparatus, and System For Reestablishing Radio Communication Links Due To Radio Link Failure" filed in the United States Patent and Trademark Office on Feb. 27, 2017, issued in the United States Patent and Trademark Office on Oct. 29, 2019 as U.S. Pat. No. 10,462,837, and claims priority to and the benefit of provisional patent application No. 62/417,931 entitled "Method, Apparatus, and System For Reestablishing Radio Communication Links Due To Radio Link Failure" filed in the United States Patent and Trademark Office on Nov. 4, 2016, the entire content of each is incorporated herein by reference as if fully set forth below in its entirety and for all applicable purposes.

BACKGROUND

Field

Various aspects of the present disclosure relate to wireless communications and, more particularly, to methods, apparatuses, and systems for reestablishing radio communication links due to radio link failure for user equipment that transmits data over a control plane.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In LTE, a Radio Link Failure (RLF) procedure allows a user equipment (UE) to move a radio communication link (e.g., radio communication connection) from a first radio access node (e.g., a cell on an evolved node B (eNB)) to a second radio access node without having to go through idle to active states in the event the radio communication link with the first radio access node fails. Ordinarily the messages from the UE to the second radio access node are secured/protected using access stratum keys to ensure that a rogue/attacker UE does not maliciously attempt to disconnect a genuine UE from an established radio communication link by initiating an improper RLF procedure with another radio access node on behalf of the genuine UE. However, certain UEs utilize the control plane (e.g., non-access stratum (NAS)) to transmit user plane data without establishing a security association (or security context/keys) with a radio access node. In such a case, those UEs cannot secure or protect messages for radio link reestablishment due to RLFs with a target radio access node because the target radio access node does not have or cannot obtain the access stratum (AS) keys.

Consequently, there is a need for methods, devices, and systems to secure and protect the radio link reestablishment procedure from malicious attacks when such a UE experiences RLF. These methods, devices, and systems may be utilized in schemes where the UE uses the control plane signaling with a network node to transmit user plane data (e.g., NarrowBand Internet-of-things (NB-IoT) UEs).

SUMMARY

One feature provides a method operational at a wireless communication device for wireless communication with a network. The method comprises establishing a radio communication connection, which uses control plane signaling connections to carry user plane data, with a first radio access node (RAN), and determining that the wireless communication device is experiencing radio link failure (RLF) with the first RAN and that the radio communication connection should be reestablished with a second RAN. The method further comprises sending a reestablishment message to the second RAN that includes parameters that enable a core network node communicatively coupled to the second RAN to authenticate the wireless communication device and allow or reject reestablishment of the radio communication connection that uses control plane signaling connections to carry user plane data with the second RAN, wherein the parameters include at least a message authentication code (MAC) based in part on one or more bits of a non-access stratum (NAS) COUNT value maintained at the wireless communication device. According to one aspect, the MAC is based in part on a plurality of least significant bits of the NAS COUNT value. According to another aspect, the parameters further include the one or more bits of the NAS COUNT value that the MAC is based on, and the parameters further include a device identifier that identifies the wireless communication device.

According to one aspect, in response to the reestablishment message, the method further comprises receiving a reestablishment success message enabling the wireless communication device to reestablish the radio communication connection with the second RAN. According to another aspect, the one or more bits of the NAS COUNT value includes all bits of the NAS COUNT value. According to yet another aspect, the method further comprises generating the MAC based in part on a cell identifier that identifies the second RAN and the NAS COUNT value maintained at the wireless communication device.

According to one aspect, a cryptographic function is used to generate the MAC based on the cell identifier and the NAS COUNT value. According to another aspect, the method further comprises incrementing the NAS COUNT value after sending the reestablishment message to the second RAN. According to yet another aspect, the method further comprises sending an RRC Connection Reestablishment Request message to the second RAN, and receiving an RRC Connection Reestablishment acknowledgement message from the second RAN in response to sending the RRC Connection Reestablishment Request message, and wherein the reestablishment message sent to the second RAN that includes the parameters is an RRC Connection Reestablishment Complete message.

According to one aspect, the first RAN is a first evolved Node B (eNB), the second RAN is a second eNB, and the core network node is a mobility management entity (MME). According to yet another aspect, the first RAN is a first cell of an evolved Node B (eNB) and the second RAN is a second cell of the eNB.

Another feature provides a wireless communication device comprising a wireless communication interface adapted to communicate with one or more radio access nodes (RANs) associated with a wireless communication network, and a processing circuit communicatively coupled to the wireless communication interface. The processing circuit is adapted to establish a radio communication connection that uses control plane signaling connections to carry user plane data with a first RAN, and determine that the wireless communication device is experiencing radio link failure (RLF) with the first RAN and that the radio communication connection should be reestablished with a second RAN. The processing circuit is further adapted to send a reestablishment message to the second RAN that includes parameters that enable a core network node communicatively coupled to the second RAN to authenticate the wireless communication device and allow or reject reestablishment of the radio communication connection that uses control plane signaling connections to carry user plane data with the second RAN, wherein the parameters include at least a message authentication code (MAC) based in part on one or more bits of a non-access stratum (NAS) COUNT value maintained at the wireless communication device. According to one aspect, the processing circuit is further adapted to, in response to the reestablishment message, receive a reestablishment success message enabling the wireless communication device to reestablish the radio communication connection with the second RAN.

According to one aspect, the processing circuit is further adapted to generate the MAC based in part on a cell identifier that identifies the second RAN and the NAS COUNT value maintained at the wireless communication device. According to another aspect, the processing circuit is further adapted to increment the NAS COUNT value after sending the reestablishment message to the second RAN. According to yet another aspect, the processing circuit is further adapted to send an RRC Connection Reestablishment Request message to the second RAN, and receive an RRC Connection Reestablishment acknowledgement message from the second RAN in response to sending the RRC Connection Reestablishment Request message, and wherein the reestablishment message sent to the second RAN that includes the parameters is an RRC Connection Reestablishment Complete message.

Another feature provides a wireless communication device comprising means for establishing a radio communication connection that uses control plane signaling connections to carry user plane data with a first radio access node (RAN) and means for determining that the wireless communication device is experiencing radio link failure (RLF) with the first RAN and that the radio communication connection should be reestablished with a second RAN. The wireless communication device further comprises means for sending a reestablishment message to the second RAN that includes parameters that enable a core network node communicatively coupled to the second RAN to authenticate the wireless communication device and allow or reject reestablishment of the radio communication connection that uses control plane signaling connections to carry user plane data with the second RAN, wherein the parameters include at least a message authentication code (MAC) based in part on one or more bits of a non-access stratum (NAS) COUNT value maintained at the wireless communication device. According to one aspect, the wireless communication device further comprises means for receiving a reestablishment success message enabling the wireless communication device to reestablish the radio communication connection with the second RAN. According to another aspect, the wireless communication device further comprises means for generating the MAC based in part on a cell identifier that identifies the second RAN and the NAS COUNT value maintained at the wireless communication device.

Another feature provides a non-transitory computer-readable storage medium having instructions stored thereon for wireless communication, the instructions which when executed by a processor causes the processor to establish a radio communication connection that uses control plane signaling connections to carry user plane data with a first RAN, and determine that the wireless communication device is experiencing radio link failure (RLF) with the first RAN and that the radio communication connection should be reestablished with a second RAN. The instructions when executed by the processor further cause the processor to send a reestablishment message to the second RAN that includes parameters that enable a core network node communicatively coupled to the second RAN to authenticate the wireless communication device and allow or reject reestablishment of the radio communication connection that uses control plane signaling connections to carry user plane data with the second RAN, wherein the parameters include at least a message authentication code (MAC) based in part on one or more bits of a non-access stratum (NAS) COUNT value maintained at the wireless communication device.

Another feature provides a network device comprising a communication interface adapted to communicate with a wireless communication device and a communication network, and a processing circuit communicatively coupled to the communication interface. The processing circuit is adapted to receive from the wireless communication device a request to reestablish a radio communication connection that uses control plane signaling connections to carry user plane data with the network device, the wireless communication device experiencing radio link failure (RLF) of a previously established radio communication connection with a radio access node (RAN). The request includes parameters that enable a core network node communicatively coupled to the network device to authenticate the wireless communication device and allow or reject reestablishment of the radio communication connection with the network device. The parameters include at least a message authentication code (MAC) based in part on one or more bits of a non-access stratum (NAS) COUNT value maintained at the wireless communication device. According to one aspect, the processing circuit is further adapted to send a message to the core network node that includes the parameters, receive confirmation from the core network node that the wireless communication device was authenticated, and reestablish the radio communication connection with the wireless communication device in response to receiving the confirmation. According to another aspect, the processing circuit is further adapted to send a message to the RAN that includes the parameters, receive confirmation from the RAN that the core network node authenticated the wireless communication device, and reestablish the radio communication connection with the wireless communication device in response to receiving the confirmation.

According to one aspect, the one or more bits of the NAS COUNT value is a plurality of least significant bits of the NAS COUNT value, and the MAC is based in part on the plurality of least significant bits of the NAS COUNT value. According to another aspect, the RAN is a first evolved Node B (eNB), the network device is a second eNB, and the core network node is a mobility management entity (MME).

Another feature provides a method for comprising receiving from the wireless communication device a request to reestablish a radio communication connection that uses control plane signaling connections to carry user plane data with the network device, the wireless communication device experiencing radio link failure (RLF) of a previously established radio communication connection with a radio access node (RAN). The request includes parameters that enable a core network node communicatively coupled to the network device to authenticate the wireless communication device and allow or reject reestablishment of the radio communication connection with the network device. The parameters include at least a message authentication code (MAC) based in part on one or more bits of a non-access stratum (NAS) COUNT value maintained at the wireless communication device. According to one aspect, the method further comprises sending a message to the core network node that includes the parameters, receiving confirmation from the core network node that the wireless communication device was authenticated, and reestablishing the radio communication connection with the wireless communication device in response to receiving the confirmation. According to another aspect, the method further comprises sending a message to the RAN that includes the parameters, receiving confirmation from the RAN that the core network node authenticated the wireless communication device, and reestablishing the radio communication connection with the wireless communication device in response to receiving the confirmation.

Another feature provides a network device comprising means for receiving from the wireless communication device a request to reestablish a radio communication connection that uses control plane signaling connections to carry user plane data with the network device, the wireless communication device experiencing radio link failure (RLF) of a previously established radio communication connection with a radio access node (RAN). The request includes parameters that enable a core network node communicatively coupled to the network device to authenticate the wireless communication device and allow or reject reestablishment of the radio communication connection with the network device. The parameters include at least a message authentication code (MAC) based in part on one or more bits of a non-access stratum (NAS) COUNT value maintained at the wireless communication device. According to one aspect, the network device further comprises means for sending a message to the core network node that includes the parameters, means for receiving confirmation from the core network node that the wireless communication device was authenticated, and means for reestablishing the radio communication connection with the wireless communication device in response to receiving the confirmation. According to another aspect, the method further comprises means for sending a message to the RAN that includes the parameters, means for receiving confirmation from the RAN that the core network node authenticated the wireless communication device, and means for reestablishing the radio communication connection with the wireless communication device in response to receiving the confirmation.

Another feature provides a non-transitory computer-readable storage medium having instructions stored thereon for wireless communication, the instructions which when executed by a processor causes the processor to receive from the wireless communication device a request to reestablish a radio communication connection that uses control plane signaling connections to carry user plane data with the network device, the wireless communication device experiencing radio link failure (RLF) of a previously established radio communication connection with a radio access node (RAN). The request includes parameters that enable a core network node communicatively coupled to the network device to authenticate the wireless communication device and allow or reject reestablishment of the radio communication connection with the network device. The parameters include at least a message authentication code (MAC) based in part on one or more bits of a non-access stratum (NAS) COUNT value maintained at the wireless communication device. According to one aspect, the instructions further cause the processor to send a message to the core network node that includes the parameters, receive confirmation from the core network node that the wireless communication device was authenticated, and reestablish the radio communication connection with the wireless communication device in response to receiving the confirmation. According to another aspect, the instructions further cause the processor to send a message to the RAN that includes the parameters, receive confirmation from the RAN that the core network node authenticated the wireless communication device, and reestablish the radio communication connection with the wireless communication device in response to receiving the confirmation.

Another feature provides a method for wireless communication at a network device. The method comprises receiving a message from a radio access node (RAN) that a wireless communication device has requested reestablishment of a radio communication connection that uses control plane signaling connections to carry user plane data with a target RAN, the wireless communication device experiencing radio link failure (RLF) of a previously established radio communication connection with a source RAN. The message includes parameters that allow the network device to authenticate the wireless communication device and allow or reject reestablishment of the radio communication connection with the target RAN, and the parameters include at least a message authentication code (MAC) based in part on one or more bits of a non-access stratum (NAS) COUNT value maintained at the wireless communication device. The method further comprises verifying whether the MAC received matches a corresponding MAC generated at the network device based on a NAS COUNT value maintained at the network device, and authenticating the wireless communication device and allowing the wireless communication device to reestablish the radio communication connection with the target RAN when the MAC received from the RAN matches the corresponding MAC generated at the network device. The method further comprises rejecting authentication of the wireless communication device and disallowing the wireless communication device from reestablishing the radio communication connection with the target RAN when the MAC received from the RAN fails to match the corresponding MAC generated at the network device.

Another feature provides a network device comprising a communication interface and a processing circuit communicatively coupled to the communication interface. The processing circuit is adapted to receive a message from a radio access node (RAN) that a wireless communication device has requested reestablishment of a radio communication connection that uses control plane signaling connections to carry user plane data with a target RAN, the wireless communication device experiencing radio link failure (RLF) of a previously established radio communication connection with a source RAN. The message includes parameters that allow the network device to authenticate the wireless communication device and allow or reject reestablishment of the radio communication connection with the target RAN, and the parameters include at least a message authentication code (MAC) based in part on one or more bits of a non-access stratum (NAS) COUNT value maintained at the wireless communication device. The processing circuit is further adapted to verify whether the MAC received matches a corresponding MAC generated at the network device based on a NAS COUNT value maintained at the network device, and authenticate the wireless communication device and allow the wireless communication device to reestablish the radio communication connection with the target RAN when the MAC received from the RAN matches the corresponding MAC generated at the network device. The processing circuit is further adapted to reject authentication of the wireless communication device and disallow the wireless communication device from reestablishing the radio communication connection with the target RAN when the MAC received from the RAN fails to match the corresponding MAC generated at the network device.

Another feature provides a network device comprising means for receiving a message from a radio access node (RAN) that a wireless communication device has requested reestablishment of a radio communication connection that uses control plane signaling connections to carry user plane data with a target RAN, the wireless communication device experiencing radio link failure (RLF) of a previously established radio communication connection with a source RAN. The message includes parameters that allow the network device to authenticate the wireless communication device and allow or reject reestablishment of the radio communication connection with the target RAN, and the parameters include at least a message authentication code (MAC) based in part on one or more bits of a non-access stratum (NAS) COUNT value maintained at the wireless communication device. The network device further comprises means for verifying whether the MAC received matches a corresponding MAC generated at the network device based on a NAS COUNT value maintained at the network device, and means for authenticating the wireless communication device and allowing the wireless communication device to reestablish the radio communication connection with the target RAN when the MAC received from the RAN matches the corresponding MAC generated at the network device. The network device further comprises means for rejecting authentication of the wireless communication device and disallowing the wireless communication device from reestablishing the radio communication connection with the target RAN when the MAC received from the RAN fails to match the corresponding MAC generated at the network device.

Another feature provides a non-transitory computer-readable storage medium having instructions stored thereon for wireless communication, the instructions which when executed by a processor causes the processor to receive a message from a radio access node (RAN) that a wireless communication device has requested reestablishment of a radio communication connection that uses control plane signaling connections to carry user plane data with a target RAN, the wireless communication device experiencing radio link failure (RLF) of a previously established radio communication connection with a source RAN. The message includes parameters that allow the network device to authenticate the wireless communication device and allow or reject reestablishment of the radio communication connection with the target RAN, and the parameters include at least a message authentication code (MAC) based in part on one or more bits of a non-access stratum (NAS) COUNT value maintained at the wireless communication device. The instructions further cause the processor to verify whether the MAC received matches a corresponding MAC generated at the network device based on a NAS COUNT value maintained at the network device, and authenticate the wireless communication device and allow the wireless communication device to reestablish the radio communication connection with the target RAN when the MAC received from the RAN matches the corresponding MAC generated at the network device. The instructions further cause the processor to reject authentication of the wireless communication device and disallow the wireless communication device from reestablishing the radio communication connection with the target RAN when the MAC received from the RAN fails to match the corresponding MAC generated at the network device.

BRIEF DESCRIPTION OF THE DRAWINGS

FIG. 10 illustrates a third exemplary process flow diagram for reestablishing a radio communication connection after experiencing RLF.

FIG. 14 illustrates a first exemplary method operational at a network device (e.g., target RAN, target eNB) for reestablishing a radio communication connection due to RLF.

DETAILED DESCRIPTION

Figure 1:
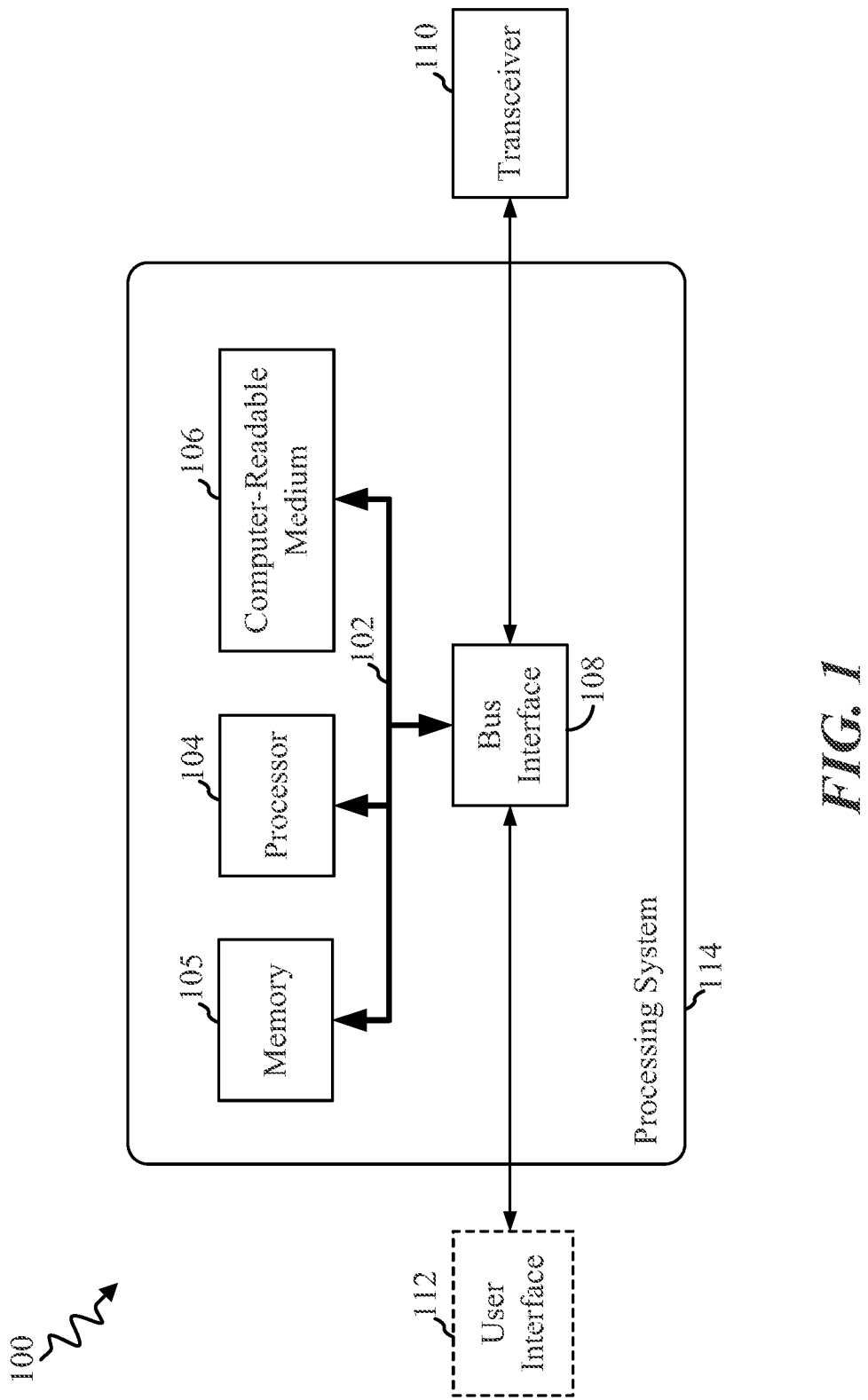
FIG. 1 is a conceptual diagram illustrating an example of a hardware implementation for an apparatus employing a processing system.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, an aspect is an implementation or example. Reference in the specification to "an aspect," "one aspect," "some aspects," "various aspects," or "other aspects" means that a particular feature, structure, or characteristic described in connection with the aspects is included in at least some aspects, but not necessarily all aspects, of the present techniques. The various appearances of "an aspect," "one aspect," or "some aspects" are not necessarily all referring to the same aspects. Elements or aspects from an aspect can be combined with elements or aspects of another aspect.

In the following description and claims, the term "coupled" may mean that two or more elements are in direct physical or electrical contact. However, "coupled" may also mean that two or more elements are not in direct contact with each other, but yet still co-operate or interact with each other.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 2:
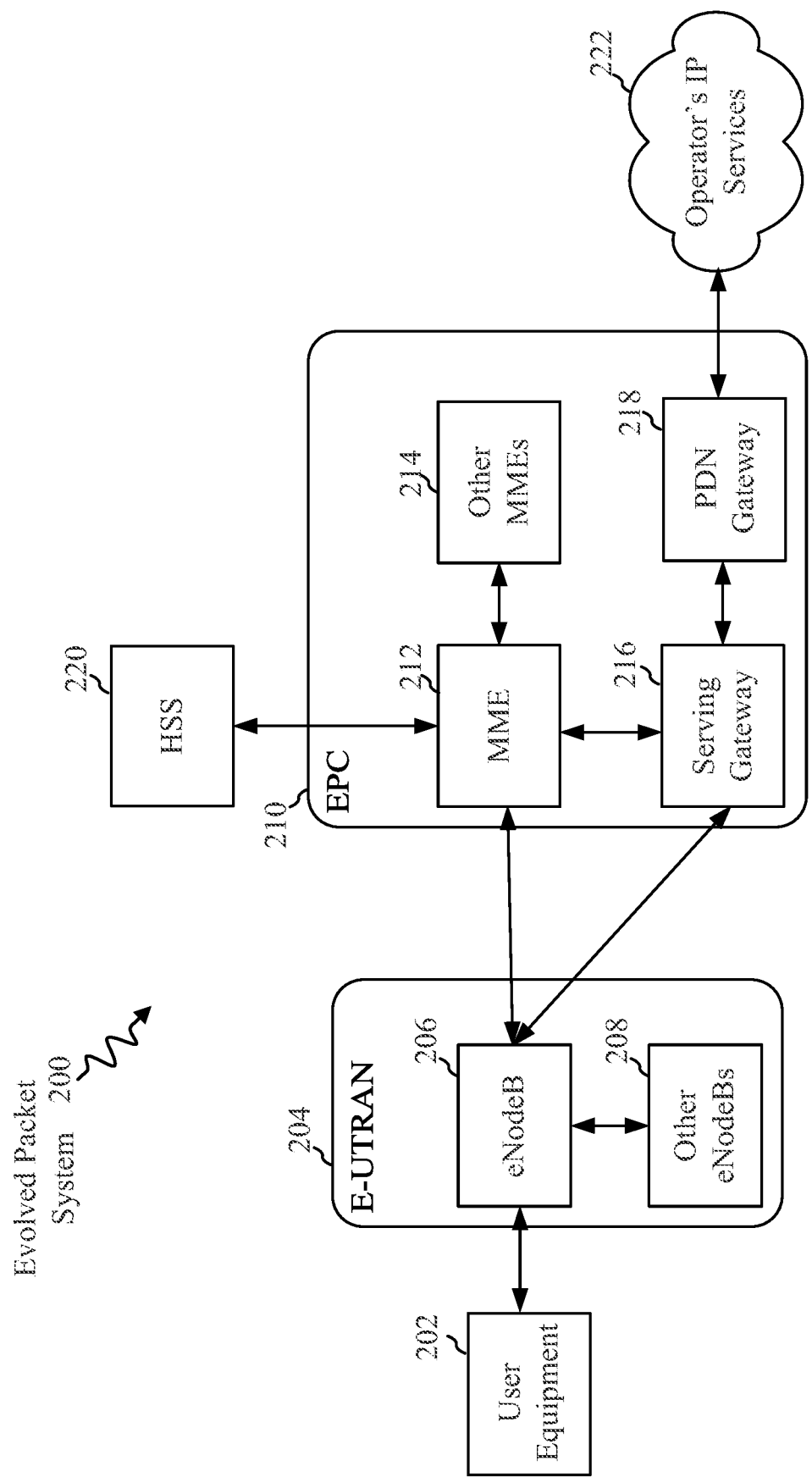
FIG. 2 is a diagram illustrating an LTE network architecture employing various apparatuses.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a user equipment (UE) as illustrated in any one or more of FIGS. 2, 3, and 7. In another example, the apparatus 100 may be a radio access node (RAN) as illustrated in any one or more of FIGS. 2, 3 and 7. As yet another example, the apparatus may be a mobility management entity (MME) as illustrated in FIG. 2.

Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 104 and/or the processing system 114, as utilized in an apparatus 100, may be used to implement any one or more of the processes of the UE, the RAN (e.g., a cell of an eNB), and/or the MME as described below and illustrated in FIGS. 8, 9A, 9B, 10, 12, and 14.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described below for any particular apparatus. The computer-readable medium 106 may also be used for storing data that is manipulated by the processor 104 when executing software.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an Si interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
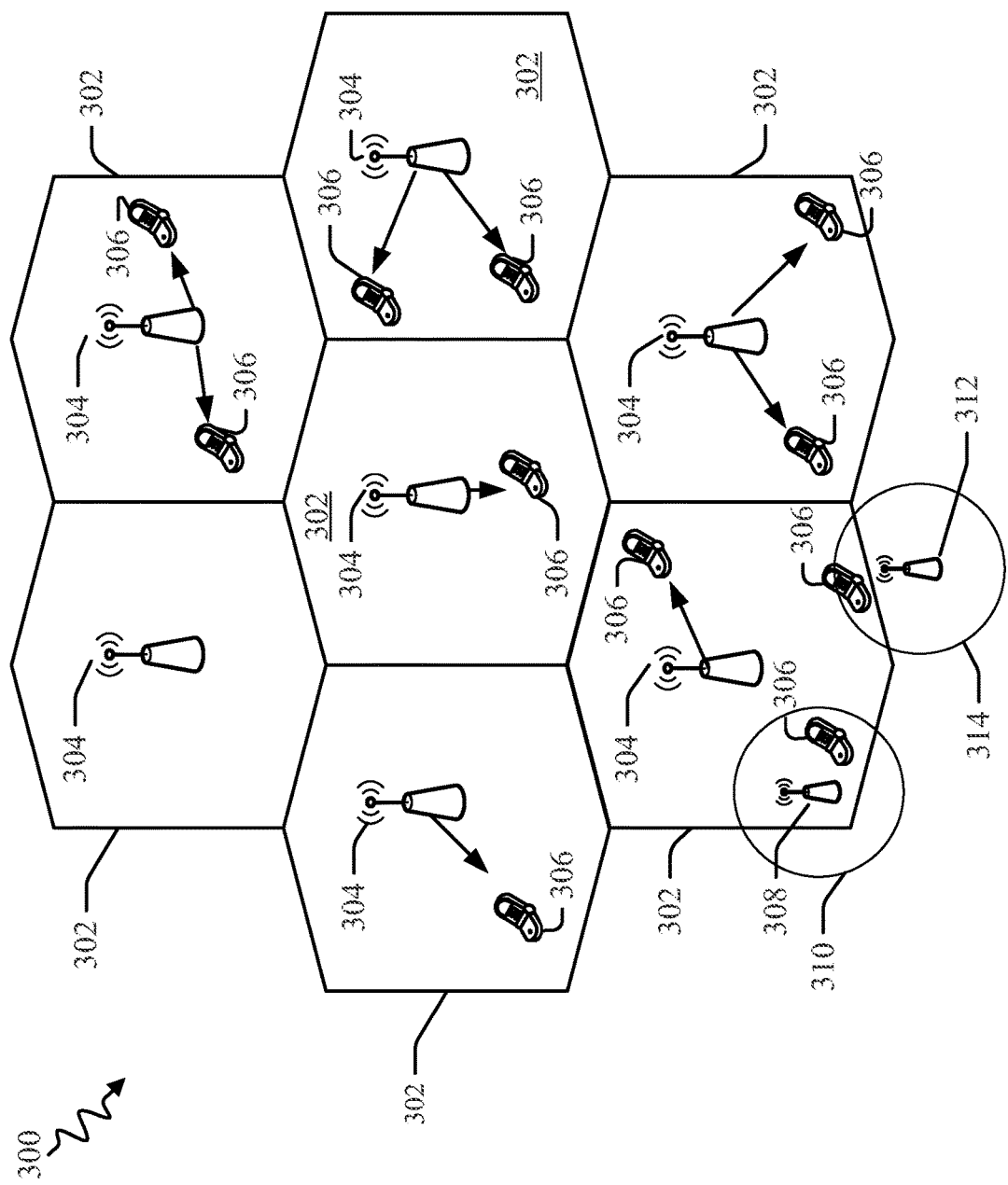
FIG. 3 is a diagram illustrating an example of an access network in an LTE network architecture.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
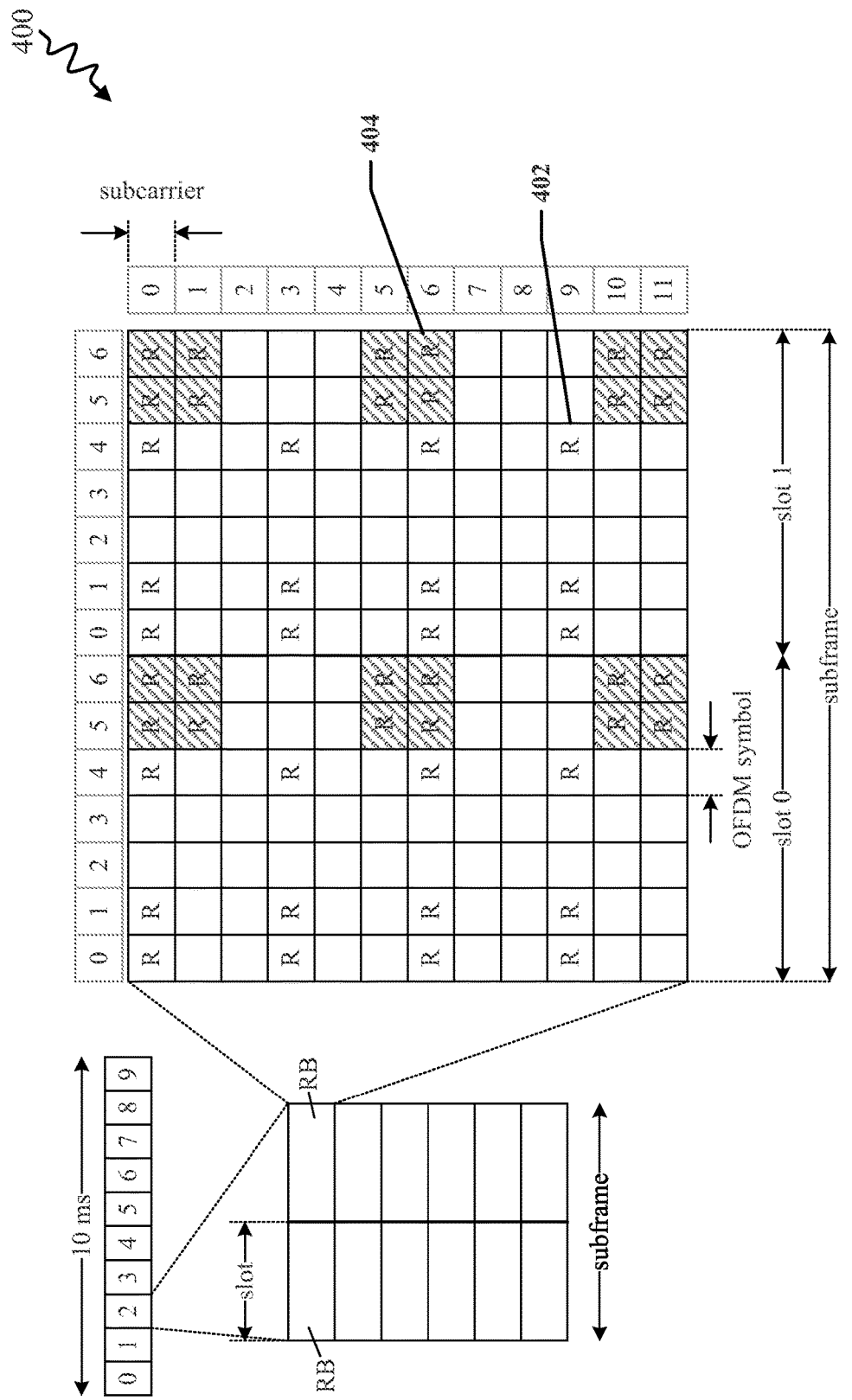
FIG. 4 illustrates an example of a downlink frame structure.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 is transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
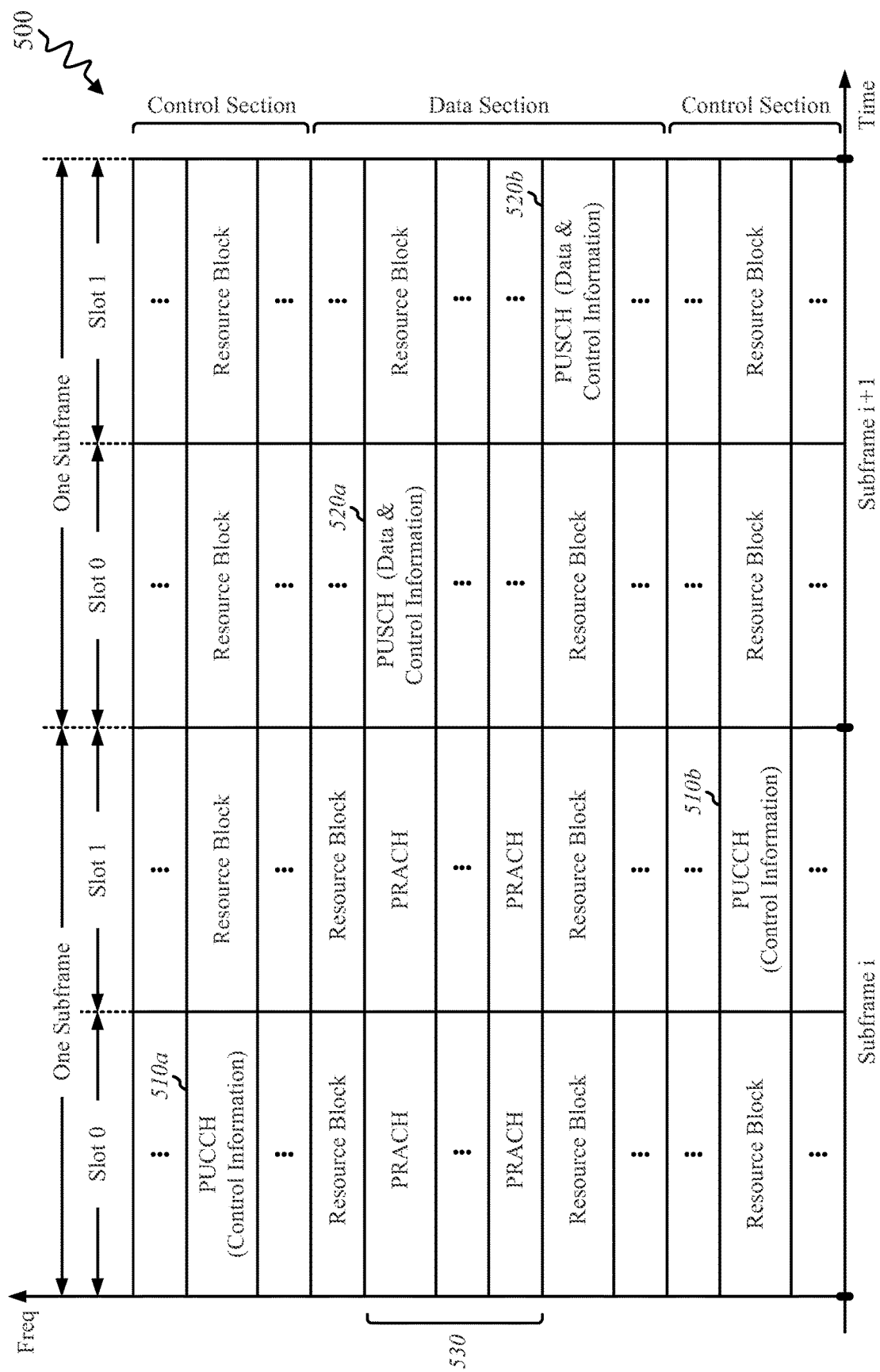
FIG. 5 shows an exemplary format for the uplink in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
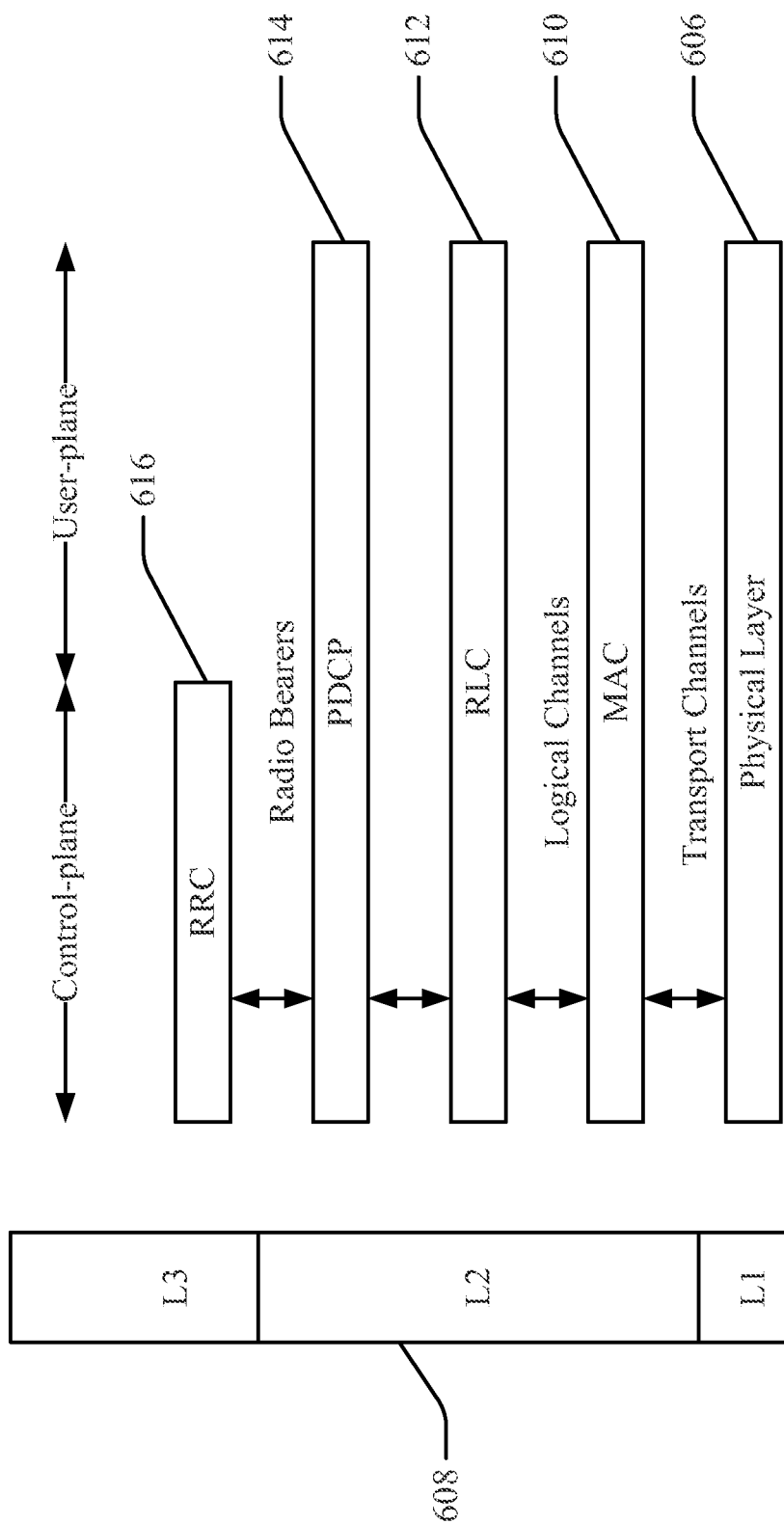
FIG. 6 is a conceptual diagram illustrating an example of the radio protocol architecture for the user and control planes.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
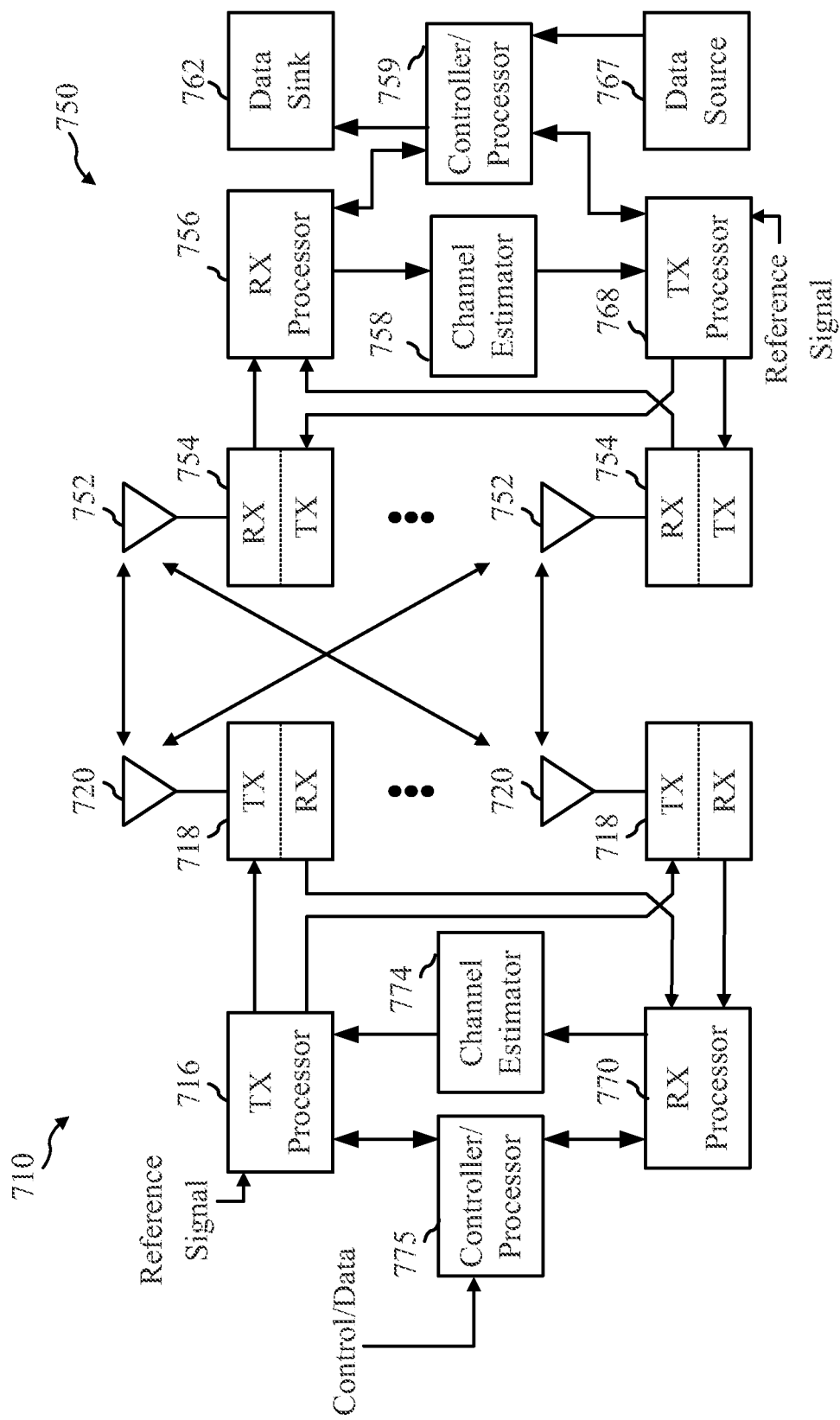
FIG. 7 is a block diagram of an eNB in communication with a UE in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations.

In one aspect, the processing system 114 described in relation to FIG. 1 may include the eNB 710 shown in FIG. 7. In particular, the processing system 114 may include the TX processor 716, the RX processor 770, and the controller/processor 775. In another aspect, the processing system 114 described in relation to FIG. 1 may include the UE 750 shown in FIG. 7. In particular, the processing system 114 may include the TX processor 768, the RX processor 756, and the controller/processor 759.

Figure 8:
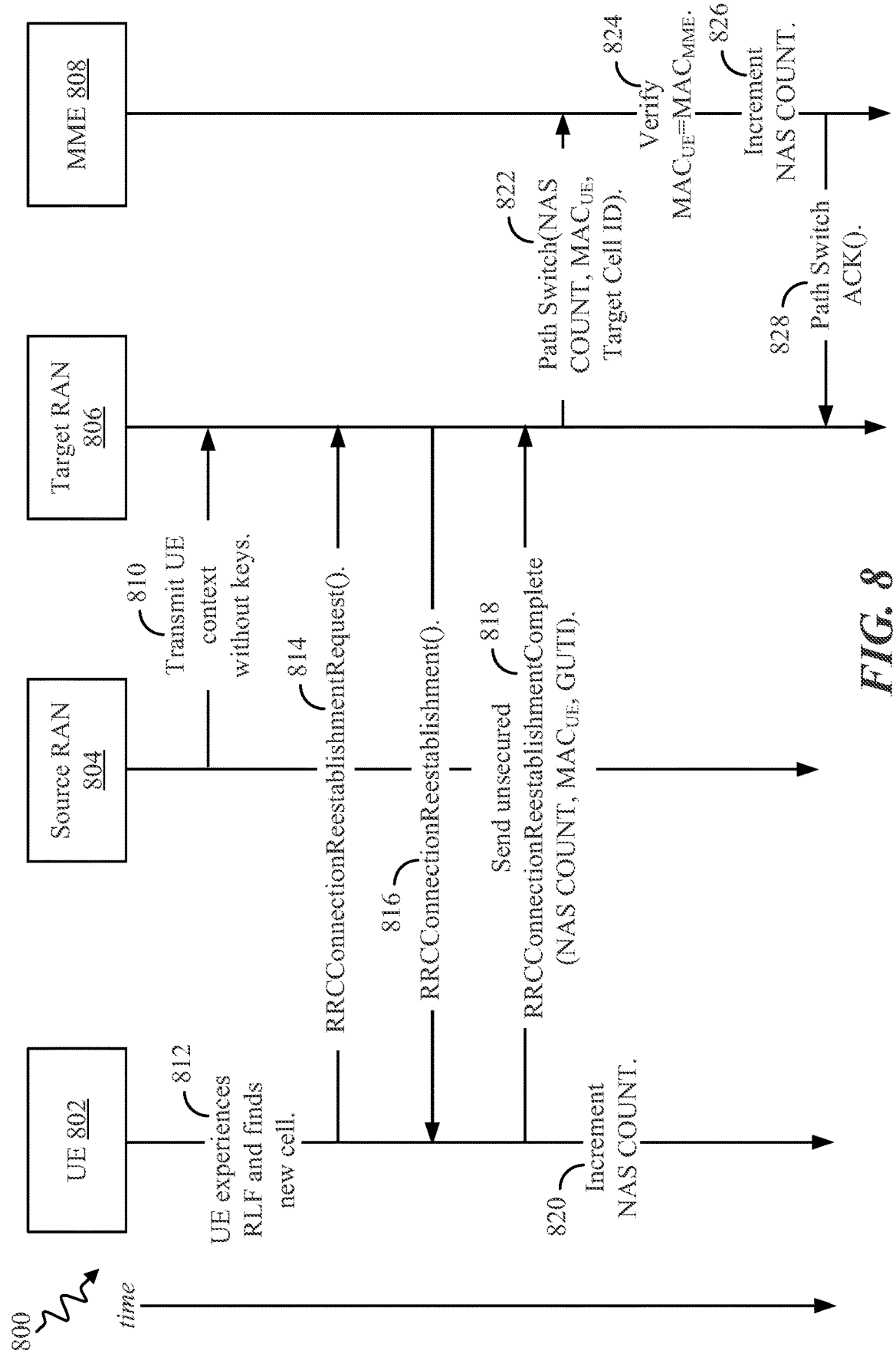
FIG. 8 illustrates a first exemplary process flow diagram for reestablishing a radio communication connection after experiencing radio link failure (RLF).

FIG. 8 illustrates a process flow diagram 800 for reestablishing a radio communication connection after experiencing radio link failure (RLF) according to one aspect. For example, the method 800 shown in FIG. 8 may be used to handle RLF in cases where the UE uses signaling connections (e.g., control plane) to carry user plane data and there is no access stratum (AS) security or AS security keys. For example, the method 800 may be used by UEs that utilize low power wide area network (LPWAN) connections, such as Narrow-Band Internet of Things (NB-IoT) communication channels in LTE, to transmit user plane data in a non-access stratum (NAS) control plane.

Referring to FIG. 8, the source RAN 804 that is or was in communication with the UE 802 may transmit 810 the UE context to the target RAN 806 to which the UE's 802 call/session will be transferred to. The UE context may include parameters that allow the target RAN 806 to tie an RLF request to the UE 802. As one non-limiting, non-exclusive example, the UE context may include the Physical Cell Identity (PCI) of the source RAN 804, the cell radio network temporary identifier (C-RNTI) identifying the UE 802 at the source RAN 804, and/or the Cell ID of the source RAN 804. The UE context may also include parameters that identify the MME 808 in communication with the UE 802, and other parameters related to the capabilities of the UE 802 needed by the target RAN 806 to serve the UE 802. In one aspect, the target RAN 806 that will serve as the serving cell when the UE 802 experiences RLF may be identified, along with other potential target RANs, and prepared (e.g., sent the UE context) by the source RAN 804 before the UE 802 experiences RLF. In other aspects, which are described in greater detail below with respect to FIG. 10, the target RAN may fetch the UE context from the source RAN.

The source RAN 804 may be a cell associated with an eNB while the target RAN 806 may be another cell associated with the same eNB or a different eNB. That is, in some aspects the source RAN 804 and the target RAN 806 may be different serving cells of the same eNB, while in other aspects they may be different serving cells of different eNBs. Transmission of the UE context from the source RAN 804 to the target RAN 806 may be optional since, in some aspects, transmission of the UE context may be unnecessary.

Referring further to FIG. 8, the UE 802 may next experience 812 RLF and finds a new serving cell such as the target RAN 806. In some cases, the UE 802 may experience RLF 812 and find the new serving cell before the source RAN 804 transmits 810 the UE context to the target RAN 806. The UE 802 may then transmit 814 an RRC Connection Reestablishment Request message to the target RAN 806, which will then respond 816 with an RRC Connection Reestablishment message acknowledging receipt of the RRC Connection Reestablishment Request message. Next, the UE 802 may transmit 818 an RRC Connection Reestablishment Complete message that includes a UE-generated message authentication code (MAC$_{UE}$) and at least one or more least significant bits (LSBs) of the NAS COUNT value. In some cases the UE 802 may transmit the entire NAS COUNT value. The UE 802 sends the NAS COUNT value that would have been used for the next NAS message. After sending 818 the message the UE 802 may increment 820 the NAS COUNT value stored at the UE 802.

The MAC$_{UE}$ in the RRC Connection Reestablishment Complete message allows the core network (e.g., MME 808) to authenticate the UE 802. In addition, a device identifier that identifies the UE 802, such as its globally unique temporary identity (GUTI) may be included in the RRC Connection Reestablishment Complete message (or in the prior RRC Connection Reestablishment Request message) so that the MME 808 can locate the UE security context. As one non-limiting, non-exclusive example, MAC$_{UE}$=f$_{Cryp}$ (k$_{NAS}$, NAS COUNT, target cell ID) where f$_{Cryp}$ is cryptographic function (e.g., keyed hash function, key derivation function, etc.), k$_{NAS}$ is a NAS cryptographic key, and the target cell ID is an identifier identifying the target RAN 806 (e.g., target cell of the eNB). That is, the MAC$_{UE}$ may be based on, among other things, the NAS key, the NAS COUNT, and the target cell ID. Basing the MAC$_{UE}$ value on the target cell ID binds the reestablishment request to a particular cell so that it can't be reused for other cells.

According to one aspect, the UE 802 may transmit 818 only a portion of the NAS COUNT value and/or use only a portion of the NAS COUNT value when calculating the MAC$_{UE}$ value, such as one or more of its least significant bits (LSB) of the NAS COUNT instead of the entire NAS COUNT value.

The target RAN 806 forwards 822 the MAC$_{UE}$ value and NAS COUNT value along with the target cell ID (i.e., cell identifier) to the MME 808 as part of a Path Switch message. Upon receiving this message, the MME 808 may then verify 824 that the MAC$_{UE}$ value received matches a MAC$_{MME}$ value it generates locally based on the NAS COUNT value it maintains as a part of the UE security context and the target cell ID. In other words, if the UE-generated MAC$_{UE}$ value matches the MME-generated MAC$_{MME}$ value then the UE 802 is authenticated and the MME 808 transmits 828 a Path Switch Acknowledgment message to the target RAN 1006 informing it that UE authentication was successful and that the reestablishment request is approved. The MME 808 may also increment 826 its own NAS COUNT value after verifying 824 the MAC$_{UE}$ value as though the message it received 822 was an integrity protected NAS message. In the event the UE-generated MAC$_{UE}$ value does not match the MME-generated MAC$_{MME}$ value then reestablishment and transfer to the target RAN 806 is denied. In one aspect, the NAS COUNT values at the UE 802 and/or the MME 808 are incremented only after successful verification 824 of the MAC$_{UE}$ value at the MME 808.

The process described above with respect to FIG. 8, allows the UE 802 and the network to utilize the existing NAS security to authenticate the UE 802. This way the system can be assured that indeed a genuine UE is legitimately experiencing an RLF and needs reestablishment instead of a rogue UE that is attempting to trick the network into thinking that a genuine UE needs reestablishment, which if granted, may disconnect a genuine UE from the network.

According to one aspect, the MAC value and NAS COUNT value transmitted 818 in the RRC Connection Reestablishment Complete message may instead be transmitted 814 in the RRC Connection Reestablishment Request message. In such an aspect the target RAN 806 may check that the UE 802 can be authenticated by communicating with the MME 808 before proceeding 816 with the RRC Connection Reestablishment message.

Figure 9A:
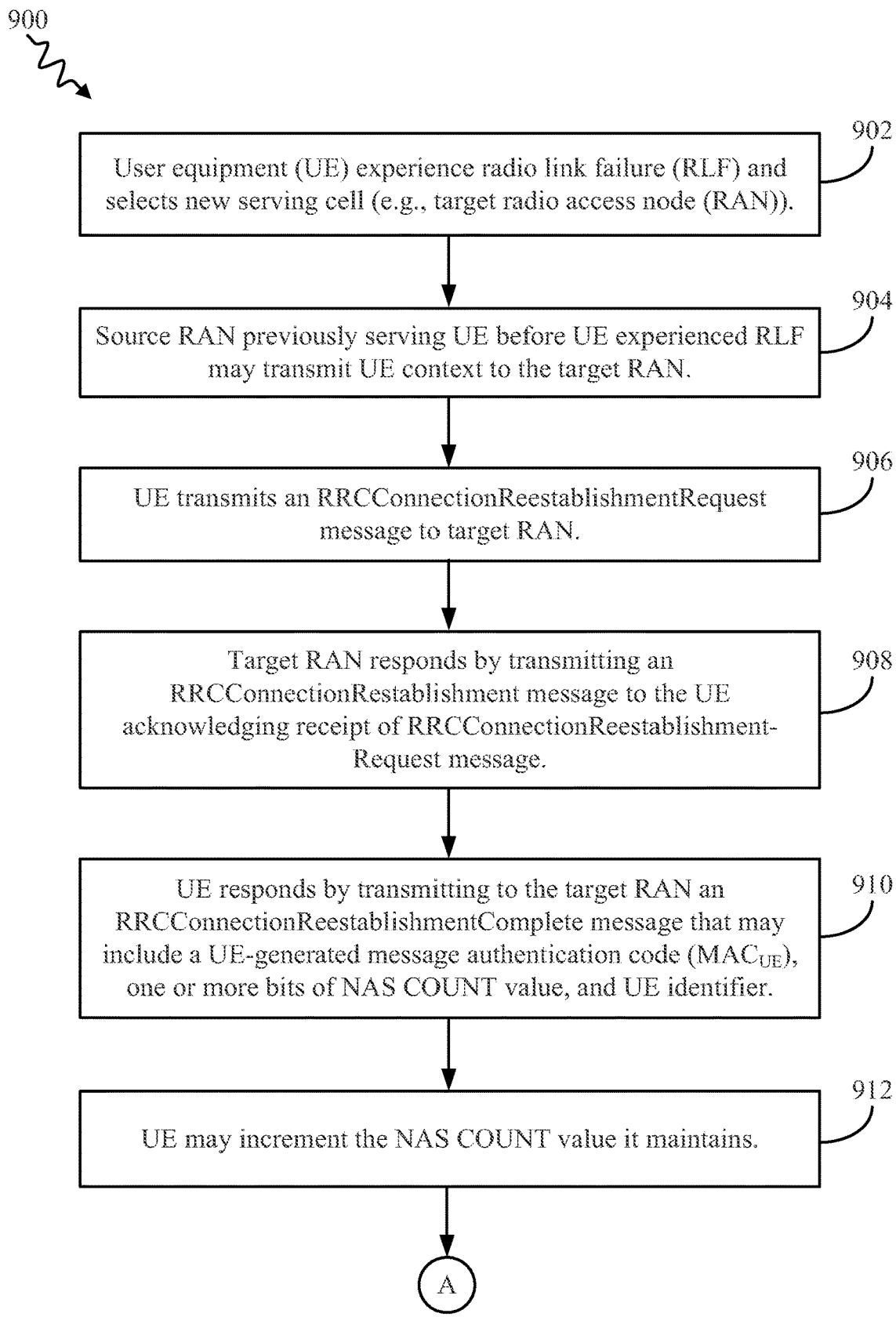
FIGS. 9A and 9B illustrate a second exemplary process flow diagram for reestablishing a radio communication connection after experiencing RLF.
Figure 9B:
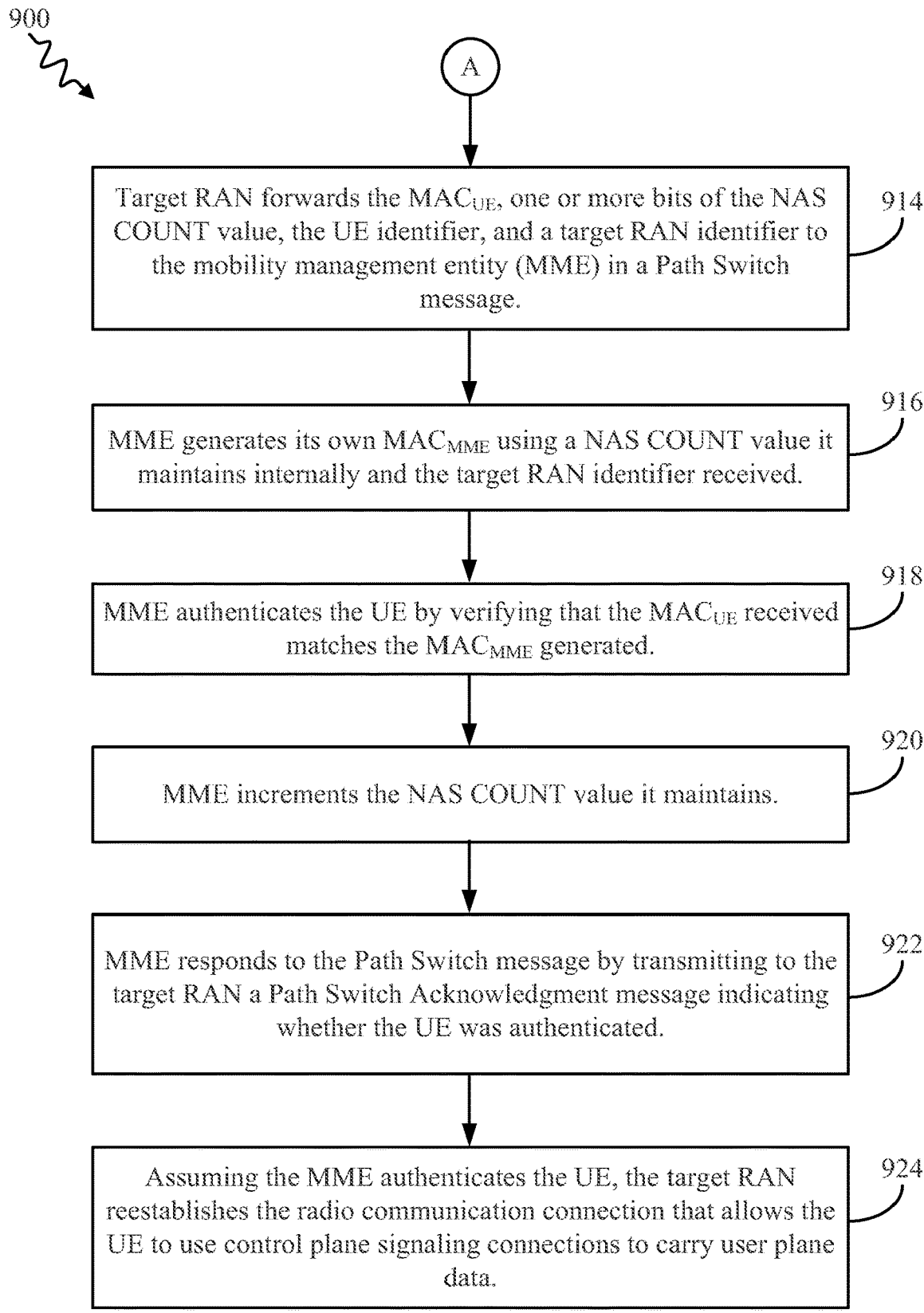

FIGS. 9A and 9B illustrate a process flow diagram 900 for reestablishing a radio communication connection after experiencing radio link failure (RLF) according to one aspect. Referring to FIG. 9A, first, a UE may experience 902 RLF and selects a target RAN to act as its new serving cell. Next, the source RAN that previously served the UE before the UE experienced RLF may transmit 904 the UE context to the target RAN. Then, the UE may transmit 906 an RRC Connection Reestablishment Request message to the target RAN. The target RAN responds by transmitting 908 an RRC Connection Reestablishment message to the UE acknowledging receipt of the RRC Connection Reestablishment Request message. Next, the UE may respond by transmitting 910 to the RAN an RRC Connection Reestablishment Complete message (e.g., one example of a "reestablishment message") that may include a UE-generated message authentication code (MAC$_{UE}$), one or more bits of the NAS COUNT value (e.g., plurality of least significant bits), and a UE identifier identifying the UE. The UE may then subsequently increment 912 the NAS COUNT value it maintains.

Referring to FIG. 9B, the target RAN may then send 914 the MAC$_{UE}$, the one or more bits of the NAS COUNT value (e.g., least significant bits), the UE identifier, and/or a RAN identifier identifying the target RAN to the MME in a Path Switch message. Next, the MME may generate 916 its own MAC$_{MME}$ using the target RAN identifier received, k$_{NAS}$, and a NAS COUNT value that it maintains locally at the MME. In some cases, the MAC$_{MME}$ and MAC$_{UE}$ may be also based on the UE identifier. Next, the MME may authenticate 918 the UE by verifying that the MAC$_{UE}$ received matches the MAC$_{MME}$ generated. The MME may next increment 920 the NAS COUNT value it maintains locally. Then, the MME may respond to the Path Switch message by transmitting 922 a Path Switch Acknowledgment message to the target RAN indicating whether the UE was successfully authenticated or not. Assuming the UE was successfully authenticated, the target RAN may reestablish 924 a radio communication connection that allows the UE to use control plane signaling connections to carry user plane data.

FIG. 10 illustrates a process flow diagram 1000 for reestablishing a radio communication connection after experiencing radio link failure (RLF) according to one aspect. For example, the method 1000 shown in FIG. 10 may be used to handle RLF in cases where the UE uses signaling connections (e.g., control plane) to carry user plane data and there is no access stratum (AS) security or AS security keys. For example, the method 1000 may be used by UEs that utilize low power wide area network (LPWAN) connections, such as Narrow-Band Internet of Things (NB-IoT) communication channels in LTE, to transmit user plane data in a non-access stratum (NAS) control plane.

Referring to FIG. 10, the UE 1002 may first establish 1010 a connection with the network (e.g., MME 1008) via the source RAN 1004 that is currently serving the UE 1002. The UE 1002 may then experience 1012 RLF and finds a new serving cell, which is the target RAN 1006. The UE 1002 may next send 1014 an RRC Connection Reestablishment Request message to the target RAN 1006 that includes one or more least significant bits or all the bits of a NAS COUNT value, a UE-generated $MAC_{UE}$ value, and/or its device identifier (e.g., GUTI). As one non-limiting, non-exclusive example, $MAC_{UE}=f_{Cryp}(k_{NAS}, NAS COUNT, target cell ID)$ where $f_{Cryp}$ is cryptographic function (e.g., keyed hash function, key derivation function, etc.), $k_{NAS}$ is a NAS cryptographic key, and the target cell ID is an identifier identifying the target RAN 1006 (e.g., target cell of the eNB). The UE 1002 may increment 1016 the NAS COUNT value that's locally stored. Next, the target RAN 1006 may send 1018 an RLF indication message to the source RAN 1004 that includes the one or more least significant bits of the NAS COUNT value received, along with the $MAC_{UE}$ and device identifier (e.g., GUTI) of the UE 1002.

The source RAN 1004 may then forward 1020 the $MAC_{UE}$ value and the one or more least significant bits of the NAS COUNT value along with the target cell ID (i.e., cell identifier of the target RAN 1006) to the MME 1008 as part of an Authentication Check message. Upon receiving this message, the MME 1008 may then verify 1022 that the $MAC_{UE}$ value received matches a $MAC_{MME}$ value it generates locally based on the NAS COUNT value it maintains as a part of the UE security context and the target cell ID. In other words, if the UE-generated $MAC_{UE}$ value matches the MME-generated $MAC_{MME}$ value then the UE 1002 is authenticated and the MME 1008 sends 1026 an Authentication Check Acknowledgment message to the source RAN 1004 informing it that UE authentication was successful and that the reestablishment request is approved. Assuming the MME 1008 authenticates the UE 1002, the source RAN 1004 may send the UE context 1028 to the target RAN 1006 so that the target RAN 1006 may reestablish the radio communication connection with the UE 1002 that allows the UE to use the control plane signaling connections to carry user plane data. The MME 1008 may also increment 1024 its own NAS COUNT value after verifying 1022 the $MAC_{UE}$ value as though the message it received 1020 was an integrity protected NAS message. In the event the UE-generated $MAC_{UE}$ value does not match the MME-generated $MAC_{MME}$ value then reestablishment and transfer to the target RAN 1006 is denied. In one aspect, the NAS COUNT values at the UE 1002 and/or the MME 1008 are incremented only after successful verification 1022 of the $MAC_{UE}$ value at the MME 1008.

Figure 11A:
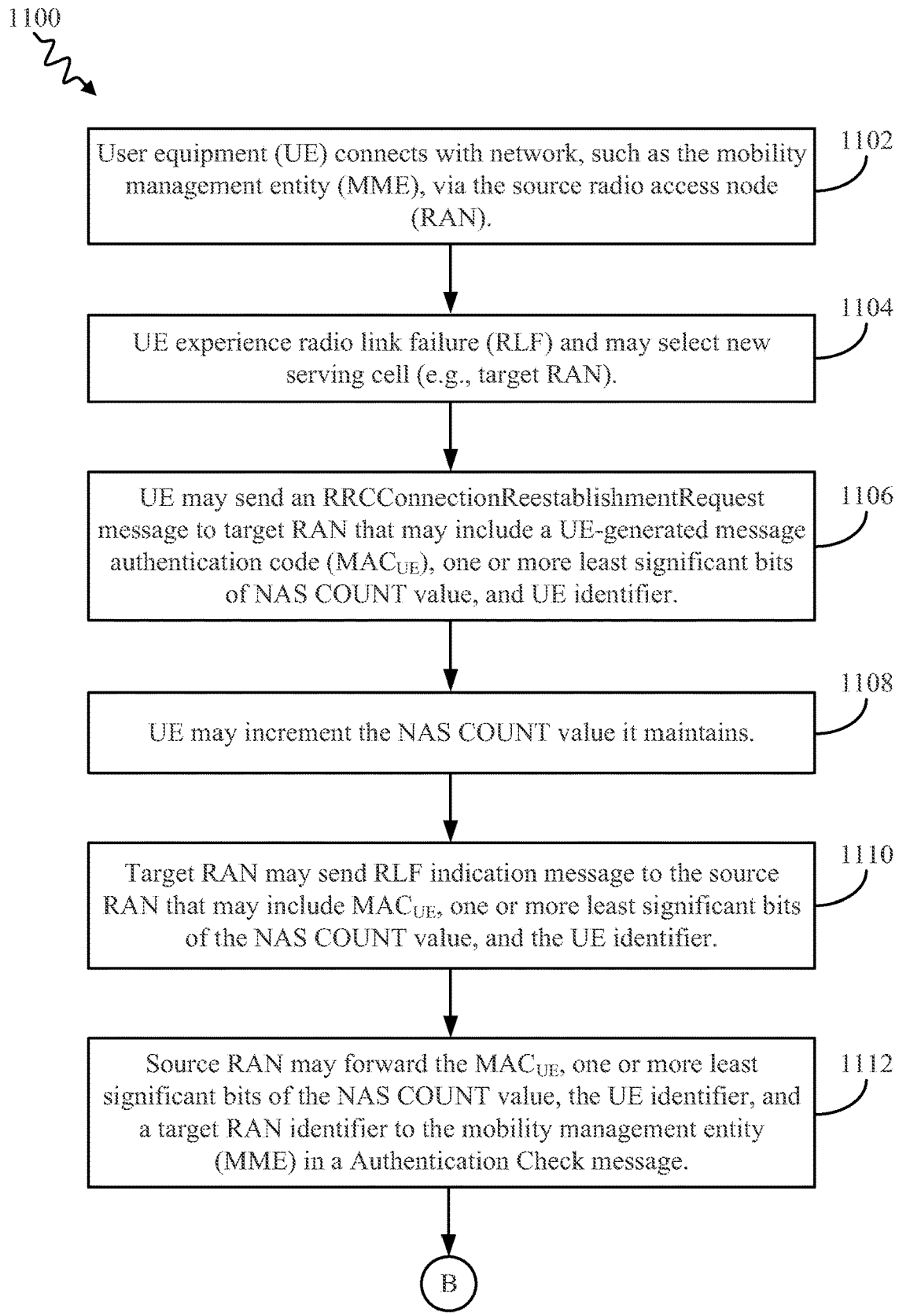
FIGS. 11A and 11B illustrate a fourth exemplary process flow diagram for reestablishing a radio communication connection after experiencing RLF.
Figure 11B:
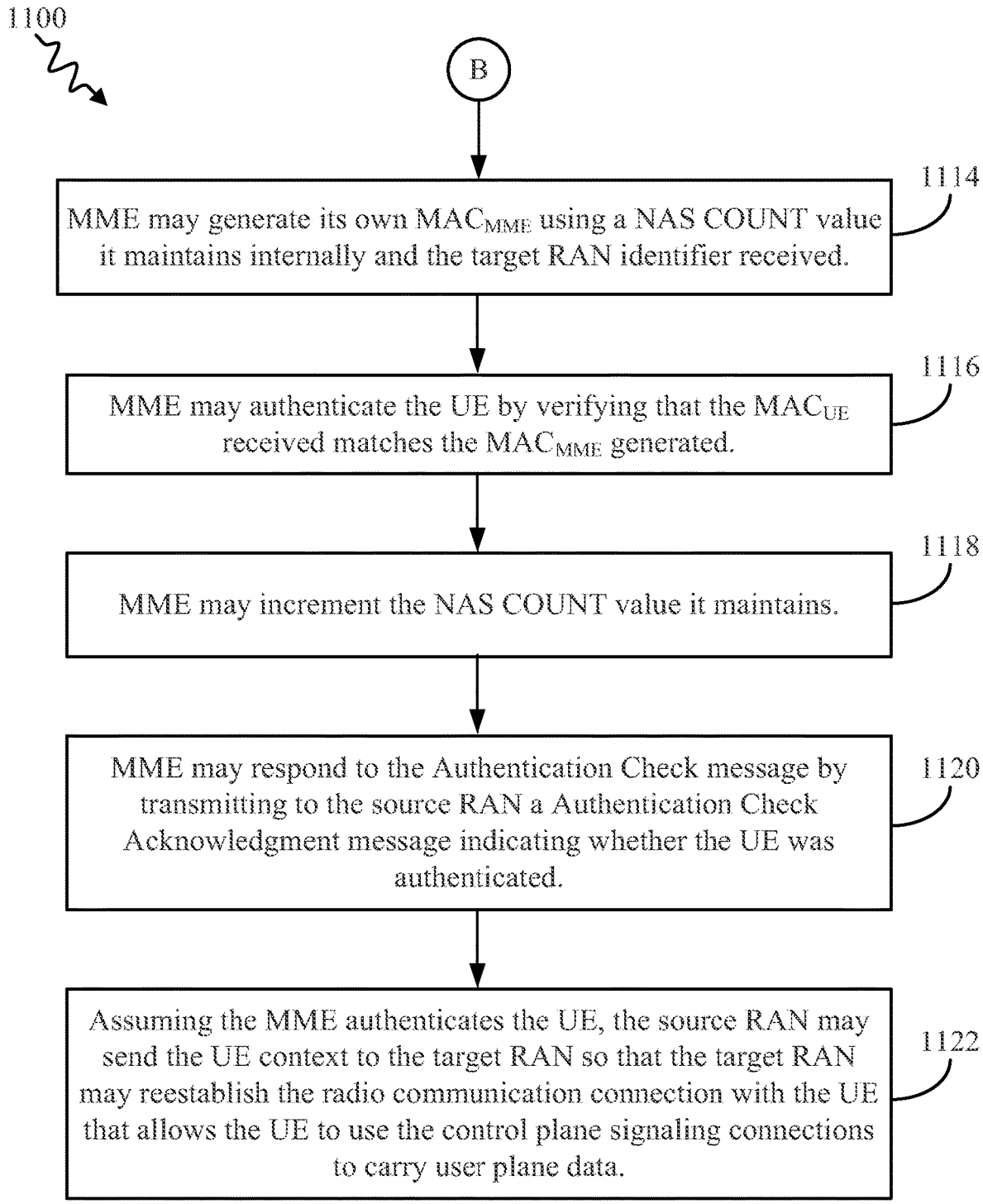

FIGS. 11A and 11B illustrate a process flow diagram 1100 for reestablishing a radio communication connection after experiencing radio link failure (RLF) according to one aspect. Referring to FIG. 11A, first, the UE connects 1102 with the network (e.g., MME) via the source RAN. Next, the UE may experience 1104 RLF and selects a new serving cell such as the target RAN. Then, the UE may send 1106 an RRC Connection Reestablishment Request message (e.g., one example of a "reestablishment message") to the target RAN that may include a UE-generated $MAC_{UE}$, one or more least significant bits of a NAS COUNT value, and/or a UE identifier. The UE may also increment 1108 its locally maintained NAS COUNT value.

Next, the target RAN may send 1110 an RLF indication message to the source RAN that may include the UE-generated $MAC_{UE}$, the one or more least significant bits of the NAS COUNT value, and the UE identifier. Then, the source RAN may send 1112 the $MAC_{UE}$, the one or more least significant bits of the NAS COUNT value, the UE identifier, and the target RAN identifier to the MME in a Authentication Check message. The MME may next generate 1114 its own $MAC_{MME}$ using the target RAN identifier received, $k_{NAS}$, and a NAS COUNT value that it maintains locally at the MME. In some cases, the $MAC_{MME}$ and $MAC_{UE}$ may be also based on the UE identifier. The MME may then authenticate 1116 the UE by verifying that the $MAC_{UE}$ received matches the $MAC_{MME}$ generated. Next, the MME may increment 1118 the NAS COUNT value it maintains locally. Then, the MME may respond to the Authentication Check message from the source RAN by transmitting 1120 a Authentication Check Acknowledgment message to the source RAN indicating whether the UE was successfully authenticated or not. Assuming the UE was successfully authenticated, the source RAN may send 1122 the UE context to the target RAN so that the target RAN may reestablish a radio communication connection with the UE that allows the UE to use control plane signaling connections to carry user plane data.

Figure 12:
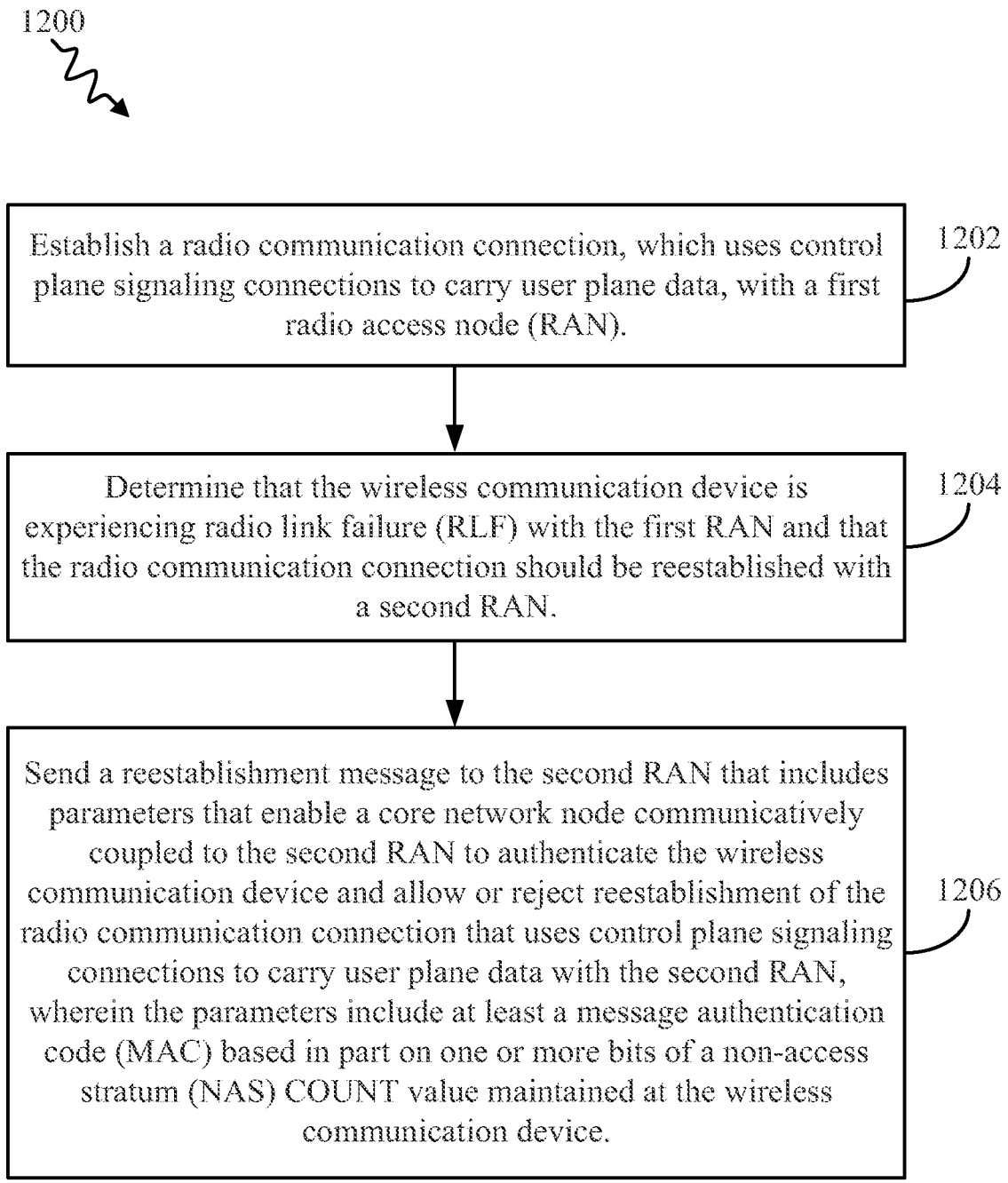
FIG. 12 illustrates a method operational at a UE for reestablishing a radio communication connection due to RLF.

FIG. 12 illustrates a method 1200 operational at a UE for reestablishing a radio communication connection due to radio link failure according to one aspect. First, a radio communication connection may be established 1202, which uses control plane signaling connections to carry user plane data, with a first radio access node (RAN). Then, it is determined 1204 that the wireless communication device is experiencing radio link failure (RLF) with the first RAN and that the radio communication connection should be reestablished with a second RAN. Next, a reestablishment message is sent 1206 to the second RAN that includes parameters that enable a core network node communicatively coupled to the second RAN to authenticate the wireless communication device and allow or reject reestablishment of the radio communication connection that uses control plane signaling connections to carry user plane data with the second RAN, wherein the parameters include at least a message authentication code (MAC) based in part on one or more bits of a non-access stratum (NAS) COUNT value maintained at the wireless communication device.

Figure 13:
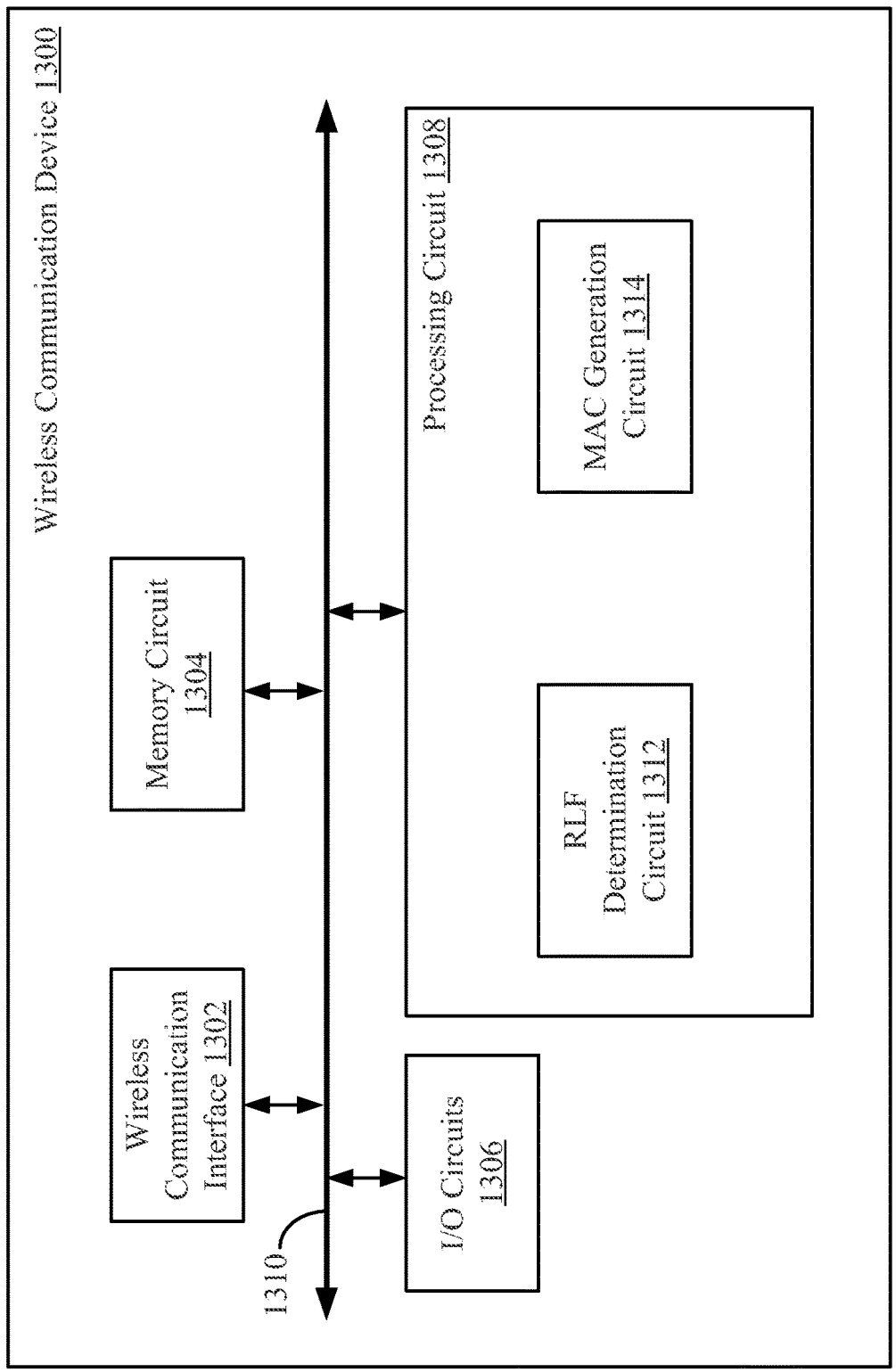
FIG. 13 illustrates a schematic block diagram of a wireless communication device.

FIG. 13 illustrates a schematic block diagram of a wireless communication device 1300 according to one aspect of the disclosure. The wireless communication device 1300 may perform one or more of the steps or actions of the user equipment described with respect to FIGS. 8, 9A, 9B, 10, 11A, 11B, and/or 12. The device 1300 may include a plurality of wireless communication interfaces 1302, one or more memory circuits 1304, one or more input and/or output (I/O) devices/circuits 1306, and/or one or more processing circuits 1308 that may be communicatively coupled to one another. For example, the interfaces 1302, the memory circuit 1304, the I/O devices 1306, and the processing circuit 1308 may be communicatively coupled to each other through a bus 1310. Among other things, the wireless communication interfaces 1302 allow the device 1300 to communicate wirelessly with radio access nodes and other network components. For example, the wireless communication interfaces 1302 may be one example of a means for establishing a radio communication connection that uses control plane signaling connections to carry user plane data, with a first RAN. The wireless communication interfaces 1302 may also be one example of a means for transmitting a reestablishment request message to the second RAN that includes parameters that enable a core network node communicatively coupled to the second RAN to authenticate the wireless communication device and allow or reject reestablishment of the radio communication connection that uses control plane signaling connections to carry user plane data with the second RAN. The wireless communication interfaces 1302 may further be an example of a means for receiving a reestablishment success message enabling the wireless communication device to reestablish the radio communication connection with the second RAN.

The memory circuit 1304 may include one or more volatile memory circuits and/or non-volatile memory circuits. Thus, the memory circuit 1304 may include DRAM, SRAM, MRAM, EEPROM, flash memory, etc. The memory circuit 1304 may store one or more values including the NAS COUNT value, GUTI, and $MAC_{UE}$. The memory circuit 1304 may also store instructions that may be executed by the processing circuit 1308. The I/O devices/circuits 1306 may include one or more keyboards, mice, displays, touchscreen displays, printers, fingerprint scanners, and any other input and/or output devices.

The processing circuit 1308 (e.g., processor, central processing unit (CPU), application processing unit (APU), etc.) may execute instructions stored at the memory circuit 1306 and/or instructions stored at another computer-readable storage medium (e.g., hard disk drive, optical disk drive, solid-state drive, etc.) communicatively coupled to the device 1300. The processing circuit 1308 may perform any one of the steps and/or processes of the UE described herein including those discussed with reference to FIGS. 8, 9A, 9B, 10, 11A, 11B, and/or 12. The processing circuit 1308 may in turn include an RLF determination circuit 1312, which may be one example of a means for sending a reestablishment message to the second RAN that includes parameters that enable a core network node communicatively coupled to the second RAN to authenticate the wireless communication device and allow or reject reestablishment of the radio communication connection that uses control plane signaling connections to carry user plane data with the second RAN. The processing circuit 1308 may further include a MAC generation circuit 1314, which may be one example of a means for generating the MAC based in part on a cell identifier that identifies the second RAN and the NAS COUNT value maintained at the wireless communication device.

FIG. 14 illustrates a method 1400 operational at a network device (e.g., target RAN, target eNB) for reestablishing a radio communication connection due to radio link failure according to one aspect. First, a request to reestablish 1402 a radio communication connection that uses control plane signaling connections to carry user plane data with the network device is received from a wireless communication device, the wireless communication device experiencing radio link failure (RLF) of a previously established radio communication connection with a radio access node (RAN) (e.g., source RAN), the request including parameters that enable a core network node communicatively coupled to the network device to authenticate the wireless communication device and allow or reject reestablishment of the radio communication connection with the network device, wherein the parameters include at least a message authentication code (MAC) based in part on one or more bits of a non-access stratum (NAS) COUNT value maintained at the wireless communication device. Next, a message is transmitted 1404 to the core network node or the RAN (e.g., source RAN) that includes the parameters.

Figure 15:
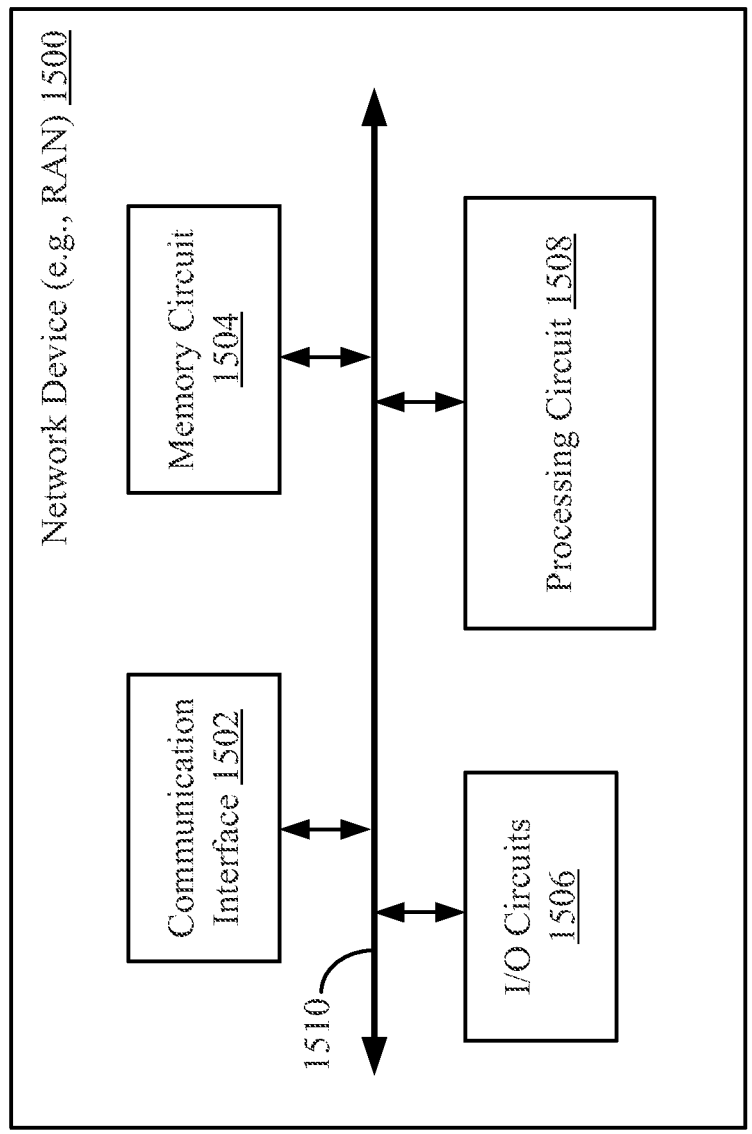
FIG. 15 illustrates a first exemplary schematic block diagram of a network device (e.g., RAN, eNB).

FIG. 15 illustrates a schematic block diagram of a network device (e.g., RAN, eNB) according to one aspect of the disclosure. The network device 1500 may perform one or more of the steps or actions of the RAN described with respect to FIGS. 8, 9A, 9B, 10, 11A, 11B, and/or 14. The network device 1500 may include a plurality of communication interfaces 1502 (e.g., wireless and/or wired), one or more memory circuits 1504, one or more input and/or output (I/O) devices/circuits 1506, and/or one or more processing circuits 1508 that may be communicatively coupled to one another. For example, the interfaces 1502, the memory circuit 1504, the I/O devices 1506, and the processing circuit 1508 may be communicatively coupled to each other through a bus 1510. Among other things, the communication interfaces 1502 allow the network device 1500 to communicate with core network nodes (e.g., MMEs) and wireless communication devices (e.g., UEs). For example, the communication interfaces 1502 may be one example of a means for receiving from the wireless communication device a request to reestablish a radio communication connection that uses control plane signaling connections to carry user plane data with the network device. The communication interfaces 1502 may further be an example of: a means for sending a message to the core network node that includes the parameters; a means for receiving confirmation from the core network node that the wireless communication device was authenticated; a means for reestablishing the radio communication connection with the wireless communication device in response to receiving the confirmation; a means for sending a message to the RAN that includes the parameters; and a means for receiving confirmation from the RAN that the core network node authenticated the wireless communication device.

The memory circuit 1504 may include one or more volatile memory circuits and/or non-volatile memory circuits. Thus, the memory circuit 1504 may include DRAM, SRAM, MRAM, EEPROM, flash memory, etc. The memory circuit 1504 may store one or more values including the NAS COUNT value, RAN identifier, and $MAC_{UE}$. The memory circuit 1504 may also store instructions that may be executed by the processing circuit 1508. The I/O devices/circuits 1506 may include one or more keyboards, mice, displays, touchscreen displays, printers, fingerprint scanners, and any other input and/or output devices.

The processing circuit 1508 (e.g., processor, central processing unit (CPU), application processing unit (APU), etc.) may execute instructions stored at the memory circuit 1506 and/or instructions stored at another computer-readable storage medium (e.g., hard disk drive, optical disk drive, solid-state drive, etc.) communicatively coupled to the network device 1500. The processing circuit 1508 may perform any one of the steps and/or processes of the RANs (e.g., target RAN or source RAN) described herein including those discussed with reference to FIGS. 8, 9A, 9B, 10, 11A, 11B, and/or 14.

Figure 16:
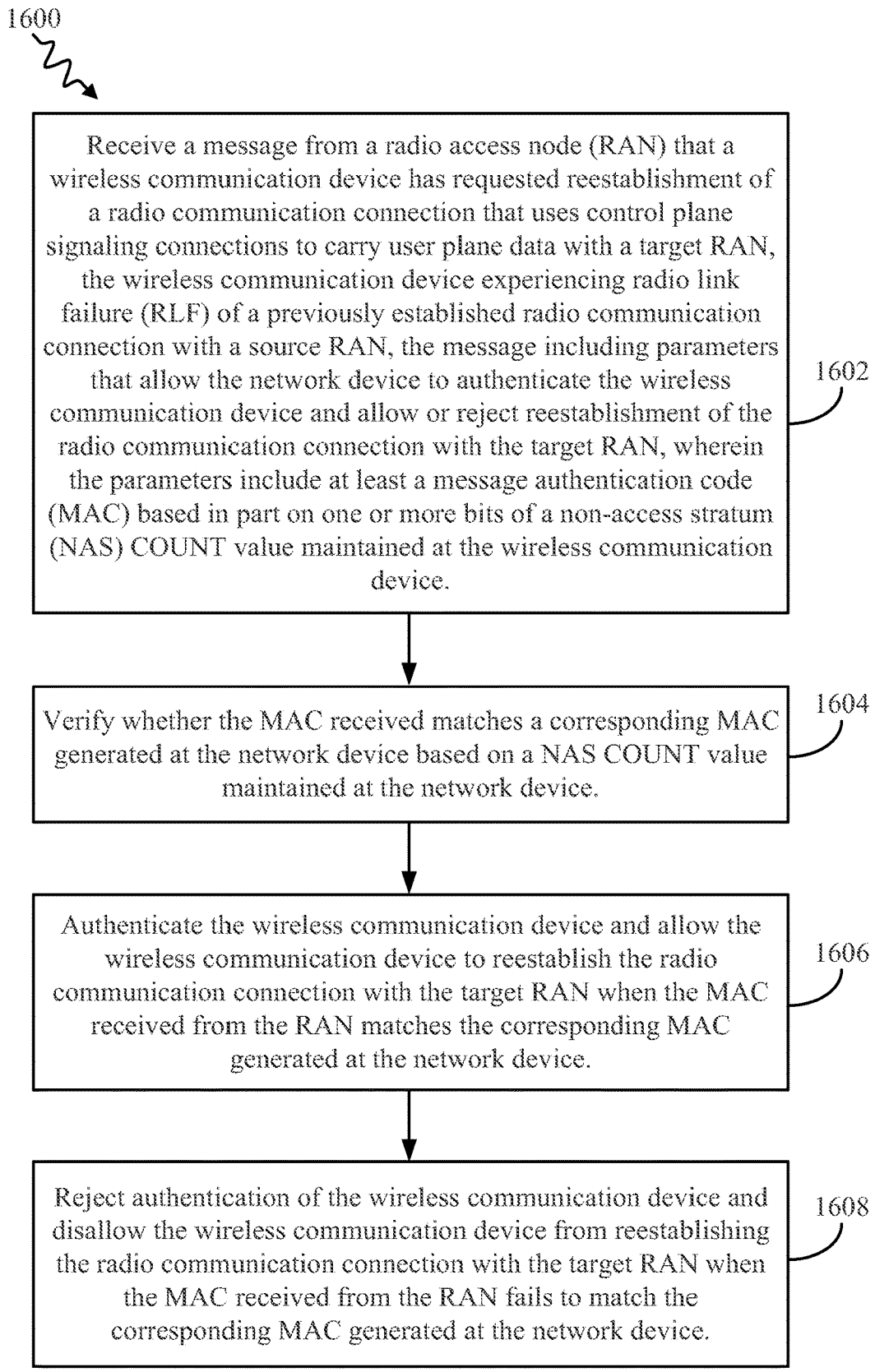
FIG. 16 illustrates a second exemplary method operational at a network device (e.g., MME, core network node) for reestablishing a radio communication connection due to RLF.

FIG. 16 illustrates a method 1600 operational at a network device (e.g., MME, core network node) for reestablishing a radio communication connection due to radio link failure according to one aspect. First, a message is received 1602 from a RAN that a wireless communication device has requested reestablishment of a radio communication connection that uses control plane signaling connections to carry user plane data with a target RAN, the wireless communication device experiencing radio link failure (RLF) of a previously established radio communication connection with a source RAN, the message including parameters that allow the network device to authenticate the wireless communication device and allow or reject reestablishment of the radio communication connection with the target RAN, wherein the parameters include at least a message authentication code (MAC) based in part on one or more bits of a non-access stratum (NAS) COUNT value maintained at the wireless communication device. Next, it is verified 1604 whether the MAC received matches a corresponding MAC generated at the network device based on a NAS COUNT value maintained at the network device. Then, the wireless communication device is authenticated 1606 and allowed to reestablish the radio communication connection with the target RAN when the MAC received from the RAN matches the corresponding MAC generated at the network device. Otherwise, authentication of the wireless communication device is rejected 1608 and reestablishing the radio communication connection with the target RAN is not allowed when the MAC received from the RAN fails to match the corresponding MAC generated at the network device.

Figure 17:
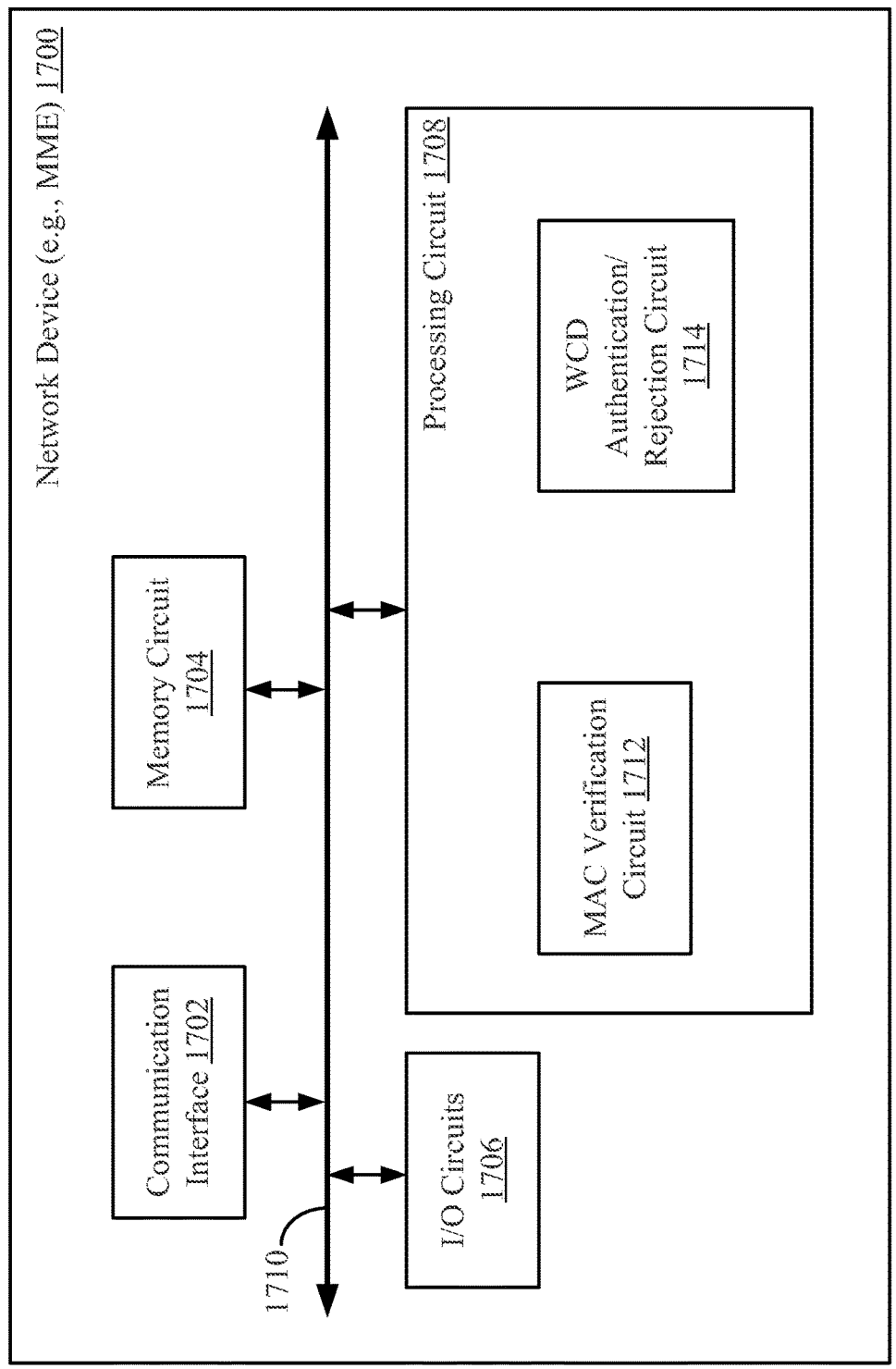
FIG. 17 illustrates a second exemplary schematic block diagram of a network device (e.g., an MME, core network node).

FIG. 17 illustrates a schematic block diagram of a network device (e.g., an MME, core network node) according to one aspect of the disclosure. The network device 1700 may perform one or more of the steps or actions of the MME described with respect to FIGS. 8, 9A, 9B, 10, 11A, 11B, and/or 16. The network device 1700 may include a plurality of communication interfaces 1702, one or more memory circuits 1704, one or more input and/or output (I/O) devices/ circuits 1706, and/or one or more processing circuits 1708 that may be communicatively coupled to one another. For example, the communication interfaces 1702, the memory circuit 1704, the I/O devices 1706, and the processing circuit 1708 may be communicatively coupled to each other through a bus 1710. Among other things, the communication interfaces 1702 allow the network device 1700 to communicate with radio access nodes and other network components. For example, the communication interfaces 1702 may be one example of a means for receiving a message from a RAN that a wireless communication device has requested reestablishment of a radio communication connection that uses control plane signaling connections to carry user plane data with a target RAN.

The memory circuit 1704 may include one or more volatile memory circuits and/or non-volatile memory circuits. Thus, the memory circuit 1704 may include DRAM, SRAM, MRAM, EEPROM, flash memory, etc. The memory circuit 1704 may store one or more values including a NAS COUNT value, $MAC_{MME}$, wireless communication device identifier (e.g., GUTI), RAN identifier, and $MAC_{UE}$. The memory circuit 1704 may also store instructions that may be executed by the processing circuit 1708. The I/O devices/ circuits 1706 may include one or more keyboards, mice, displays, touchscreen displays, printers, fingerprint scanners, and any other input and/or output devices.

The processing circuit 1708 (e.g., processor, central processing unit (CPU), application processing unit (APU), etc.) may execute instructions stored at the memory circuit 1706 and/or instructions stored at another computer-readable storage medium (e.g., hard disk drive, optical disk drive, solid-state drive, etc.) communicatively coupled to the network device 1700. The processing circuit 1708 may perform any one of the steps and/or processes of the MME described herein including those discussed with reference to FIGS. 8, 9A, 9B, 10, 11A, 11B, and/or 16. The processing circuit 1708 may in turn include a MAC verification circuit 1712, which may be one example of a means for verifying whether the MAC received matches a corresponding MAC generated at the core network node based on a NAS COUNT value maintained at the core network node. The processing circuit 1708 may further include a wireless communication device (WCD) authentication/rejection circuit 1714, which may be one example of: a means for authenticating the wireless communication device and allowing the wireless communication device to reestablish the radio communication connection with the target RAN when the MAC received from the RAN matches the corresponding MAC generated at the network device; and a means for rejecting authentication of the wireless communication device and disallowing the wireless communication device from reestablishing the radio communication connection with the target RAN when the MAC received from the RAN fails to match the corresponding MAC generated at the network device.

One or more of the components, steps, features, and/or functions illustrated in FIGS. 1, 2, 3, 4, 5, 6, 7, 8, 9A, 9B, 10, 11A, 11B, 12, 13, 14, 15, 16, and/or 17 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 7, 13, 15, and/or 17 may be configured to perform one or more of the methods, features, or steps described in FIGS. 4, 5, 6, 8, 9A, 9B, 10, 11A, 11B, 12, 14, and/or 16. The algorithms described herein may also be efficiently implemented in software and/or embedded in hardware.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. As just one example the processing circuit 104 of FIG. 1 may be an ASIC that is hard wired to specifically perform one or more of the steps illustrated in FIGS. 8, 9A, 9B, 10, 11A, 11B, 12, 14, and/or 16. As another example, the processing circuit 1308 of FIG. 13 may be an ASIC that is hard wired to specifically perform one or more of the steps illustrated in FIGS. 8, 9A, 9B, 10, 11A, 11B, and/or 12. As another example, the processing circuit 1508 of FIG. 15 may be an ASIC that is hard wired to specifically perform one or more of the steps illustrated in FIGS. 8, 9A, 9B, 10, 11A, 11B, and/or 14. As another example, the processing circuit 1708 of FIG. 17 may be an ASIC that is hard wired to specifically perform one or more of the steps illustrated in FIGS. 8, 9A, 9B, 10, 11A, 11B, and/or 16.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a wireless communication device for wireless communication with a network, the method comprising:
    establishing a radio communication connection with a first radio access node;
    determining that the wireless communication device is experiencing a radio link failure (RLF) with the first radio access node and that the radio communication connection should be reestablished with a second radio access node that has not established an access stratum security association with the wireless communication device;
    obtaining a message authentication code (MAC) based in part on one or more bits of a non-access stratum (NAS) COUNT value maintained at the wireless communication device; and
    sending a reestablishment message including the MAC to the second radio access node, the MAC configured to enable a core network node communicatively coupled to the second radio access node to authenticate the wireless communication device and allow or reject reestablishment of the radio communication connection with the second radio access node.

2. The method of claim 1, wherein the MAC is further based on a target cell identifier.

3. The method of claim 1, further comprising:
    receiving a reestablishment success message configured to enable the wireless communication device to reestablish the radio communication connection with the second radio access node.

4. The method of claim 1, further comprising:
    incrementing the NAS COUNT value after sending the reestablishment message to the second radio access node.

5. The method of claim 1, wherein the reestablishment message is a radio resource control (RRC) Connection Reestablishment Complete message.

6. The method of claim 1, wherein prior to sending the reestablishment message, the method further comprises:
    sending a radio resource control (RRC) Connection Reestablishment Request message to the second radio access node;

receiving an RRC Connection Reestablishment message from the second radio access node in response to sending the RRC Connection Reestablishment Request message; and sending the reestablishment message, wherein the reestablishment message is an RRC Connection Reestablishment Complete message.

7. The method of claim 1, wherein the first radio access node is a first cell of an evolved Node B (eNB) and the second radio access node is a second cell of the eNB.

8. A network device comprising:
a communication interface adapted to communicate with a wireless communication device and a core network node of a communication network; and
a processing circuit communicatively coupled to the communication interface, the processing circuit adapted to:
receive from the wireless communication device via the communication interface a message following a radio link failure (RLF) of a radio communication connection between the wireless communication device and a radio access node, the network device not having an access stratum security association established with the wireless communication device;
wherein the message includes a message authentication code (MAC) based in part on one or more bits of a non-access stratum (NAS) COUNT value maintained at the wireless communication device, the MAC configured to enable the core network node communicatively coupled to the network device to authenticate the wireless communication device and allow or reject reestablishment of the radio communication connection with the network device.

9. The network device of claim 8, wherein the MAC is further based on a target cell identifier.

10. The network device of claim 8, wherein prior to sending the message, the processing circuit is further adapted to:
receive a radio resource control (RRC) Connection Reestablishment Request message from the wireless communication device;
send an RRC Connection Reestablishment message to the wireless communication device in response to receiving the RRC Connection Reestablishment Request message; and
send the message, wherein the message is an RRC Connection Reestablishment Complete message.

11. The network device of claim 8, wherein the processing circuit is further adapted to:
send a second message to the core network node that includes the MAC;
receive a confirmation from the core network node that the wireless communication device was authenticated; and
reestablish the radio communication connection with the wireless communication device in response to receiving the confirmation.

12. The network device of claim 8, wherein the processing circuit is further adapted to:
send a second message to the radio access node that includes the MAC;
receive a wireless communication device context from the radio access node in response to sending the message to the radio access node that includes the MAC; and
reestablish the radio communication connection with the wireless communication device in response to receiving the wireless communication device context.

13. The network device of claim 8, wherein the radio access node is a first evolved Node B (eNB), the network device is a second eNB, and the core network node is a mobility management entity (MME).

14. A wireless communication device comprising:
a communication interface adapted to communicate with a first radio access node and a second radio access node; and
a processing circuit communicatively coupled to the communication interface, the processing circuit adapted to:
establish a radio communication connection with the first radio access node;
determine that the wireless communication device is experiencing a radio link failure (RLF) with the first radio access node and that the radio communication connection should be reestablished with the second radio access node that has not established an access stratum security association with the wireless communication device;
obtain a message authentication code (MAC) based in part on one or more bits of a non-access stratum (NAS) COUNT value maintained at the wireless communication device; and
send a reestablishment message including the MAC to the second radio access node, the MAC configured to enable a core network node communicatively coupled to the second radio access node to authenticate the wireless communication device and allow or reject reestablishment of the radio communication connection with the second radio access node.

15. The wireless communication device of claim 14, wherein the MAC is further based on a target cell identifier.

16. The wireless communication device of claim 14, wherein the processing circuit is further adapted to:
receive a reestablishment success message configured to enable the wireless communication device to reestablish the radio communication connection with the second radio access node.

17. The wireless communication device of claim 14, wherein the processing circuit is further adapted to:
increment the NAS COUNT value after sending the reestablishment message to the second radio access node.

18. The wireless communication device of claim 14, wherein the reestablishment message is a radio resource control (RRC) Connection Reestablishment Complete message.

19. The wireless communication device of claim 14, wherein prior to sending the reestablishment message, the processing circuit is further adapted to:
send a radio resource control (RRC) Connection Reestablishment Request message to the second radio access node;
receive an RRC Connection Reestablishment message from the second radio access node in response to sending the RRC Connection Reestablishment Request message; and
send the reestablishment message, wherein the reestablishment message is an RRC Connection Reestablishment Complete message.

20. The wireless communication device of claim 14, wherein the first radio access node is a first cell of an evolved Node B (eNB) and the second radio access node is a second cell of the eNB.

* * * * *